(12) United States Patent
Takahashi et al.

(10) Patent No.: US 10,362,262 B2
(45) Date of Patent: Jul. 23, 2019

(54) DATA RECORDING APPARATUS AND METHOD OF CONTROLLING THE SAME

(71) Applicant: CANON KABUSHIKI KAISHA, Tokyo (JP)

(72) Inventors: Fumiaki Takahashi, Kawasaki (JP); Kanako Yamakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/580,747

(22) PCT Filed: Jun. 21, 2016

(86) PCT No.: PCT/JP2016/002989
§ 371 (c)(1),
(2) Date: Dec. 8, 2017

(87) PCT Pub. No.: WO2017/002328
PCT Pub. Date: Jan. 5, 2017

(65) Prior Publication Data
US 2018/0152662 A1    May 31, 2018

(30) Foreign Application Priority Data
Jun. 29, 2015  (JP) .................................. 2015-130328

(51) Int. Cl.
*H04N 5/77* (2006.01)
*H04N 5/225* (2006.01)
(Continued)

(52) U.S. Cl.
CPC ............. *H04N 5/772* (2013.01); *H04N 5/225* (2013.01); *H04N 5/23245* (2013.01);
(Continued)

(58) Field of Classification Search
CPC .... H04N 5/772; H04N 5/225; H04N 5/23245; H04N 5/3696; H04N 9/8042; H04N 9/8205
See application file for complete search history.

(56) References Cited

U.S. PATENT DOCUMENTS

2007/0201832 A1   8/2007  Date et al.
2009/0208119 A1*  8/2009  Lee ..................... G11B 27/034
                                                     382/232
(Continued)

FOREIGN PATENT DOCUMENTS

JP    2007-243907 A    9/2007
JP    2014-096194 A    5/2014
(Continued)

OTHER PUBLICATIONS

CIPA DC-007-2009 "Multi-Picture Format", established on Feb. 4, 2009, [online], General Incorporated Association, Camera & Imaging Products Association, [found on May 19, 2015], Internet <URL:www.cipa.jp/std/documents/j/DC-007_J.pdf>.
(Continued)

*Primary Examiner* — Thai Q Tran
*Assistant Examiner* — Sunghyoun Park
(74) *Attorney, Agent, or Firm* — Cowan, Liebowitz & Latman, P.C.

(57) ABSTRACT

A data recording apparatus stores, in a data file having a container structure, multiple pieces of image data that have different expression methods, such as moving image data and still image data, along with metadata regarding the pieces of image data, and records the data file. The data recording apparatus stores the pieces of image data having different expression methods in the data file in the same
(Continued)

container format. Accordingly, it is possible to generate a data file that stores various formats of data and has versatility.

12 Claims, 22 Drawing Sheets

(51) Int. Cl.
   *H04N 9/804* (2006.01)
   *H04N 9/82* (2006.01)
   *H04N 5/369* (2011.01)
   *H04N 5/232* (2006.01)

(52) U.S. Cl.
   CPC ......... *H04N 5/3696* (2013.01); *H04N 9/8042* (2013.01); *H04N 9/8205* (2013.01)

(56) References Cited

U.S. PATENT DOCUMENTS

| | | | |
|---|---|---|---|
| 2011/0025865 A1* | 2/2011 | Kunishige | H04N 5/232 348/220.1 |
| 2012/0002076 A1* | 1/2012 | Takahashi | H04N 5/23232 348/231.2 |
| 2012/0033958 A1* | 2/2012 | Ishida | H04N 1/2145 396/153 |
| 2012/0194691 A1* | 8/2012 | Yasutomi | H04N 5/772 348/220.1 |
| 2012/0288208 A1 | 11/2012 | Katsumata et al. | |

FOREIGN PATENT DOCUMENTS

| | | |
|---|---|---|
| JP | 2014-197848 A | 10/2014 |
| JP | 2015-159484 A | 9/2015 |

OTHER PUBLICATIONS

The US and foreign references were cited the International Search Report of PCT/JP2016/002989 dated Aug. 2, 2016.

The above foreign patent documents were cited in the May 20, 2019 Japanese Office Action, which is enclosed without an English Translation, that issued in Japanese Patent Application No. 2015130328.

\* cited by examiner

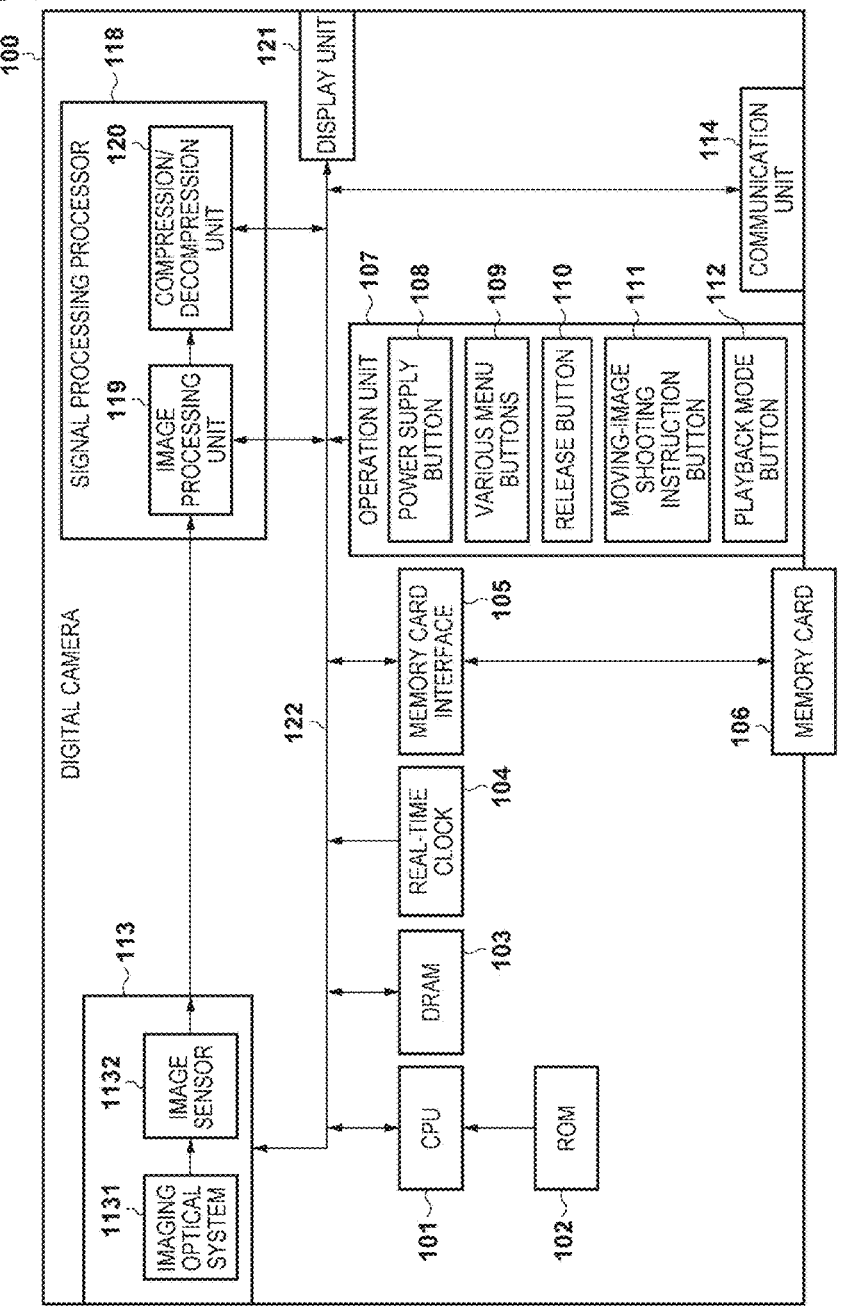
[Fig. 1]

[Fig. 2]
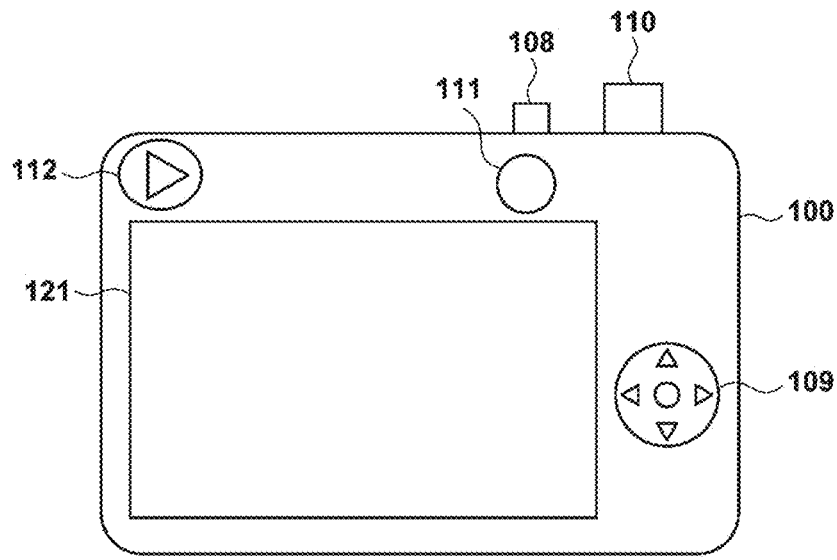
[Fig. 3]
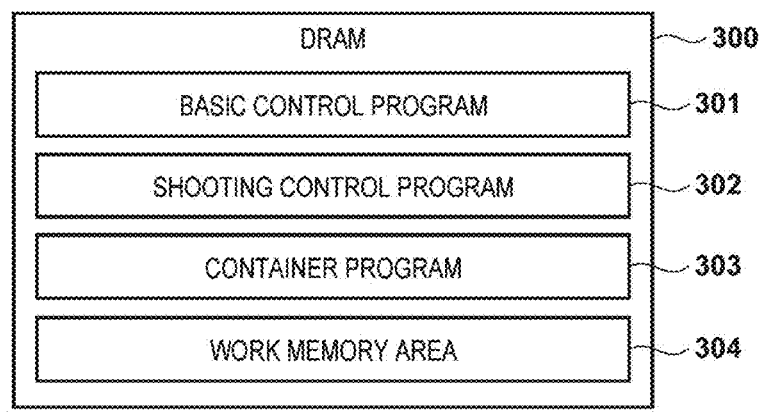

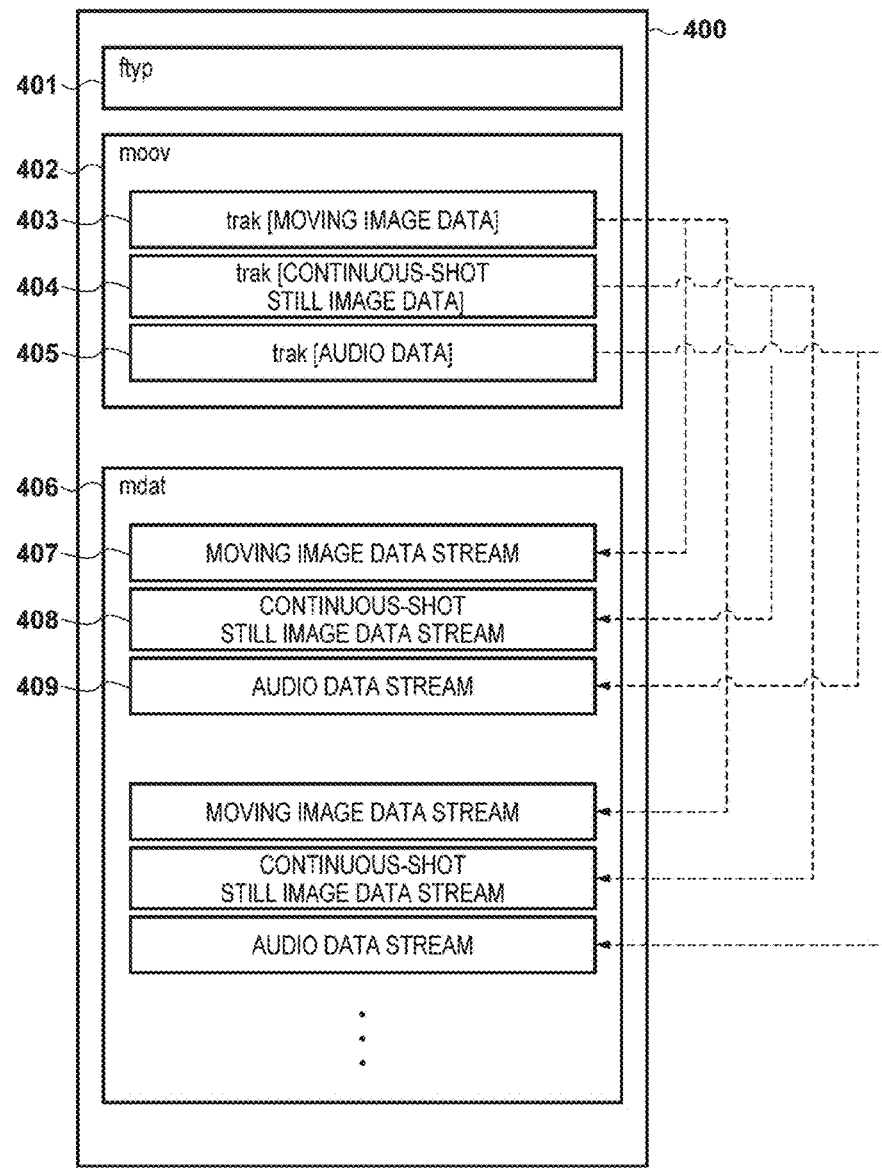

[Fig. 5]
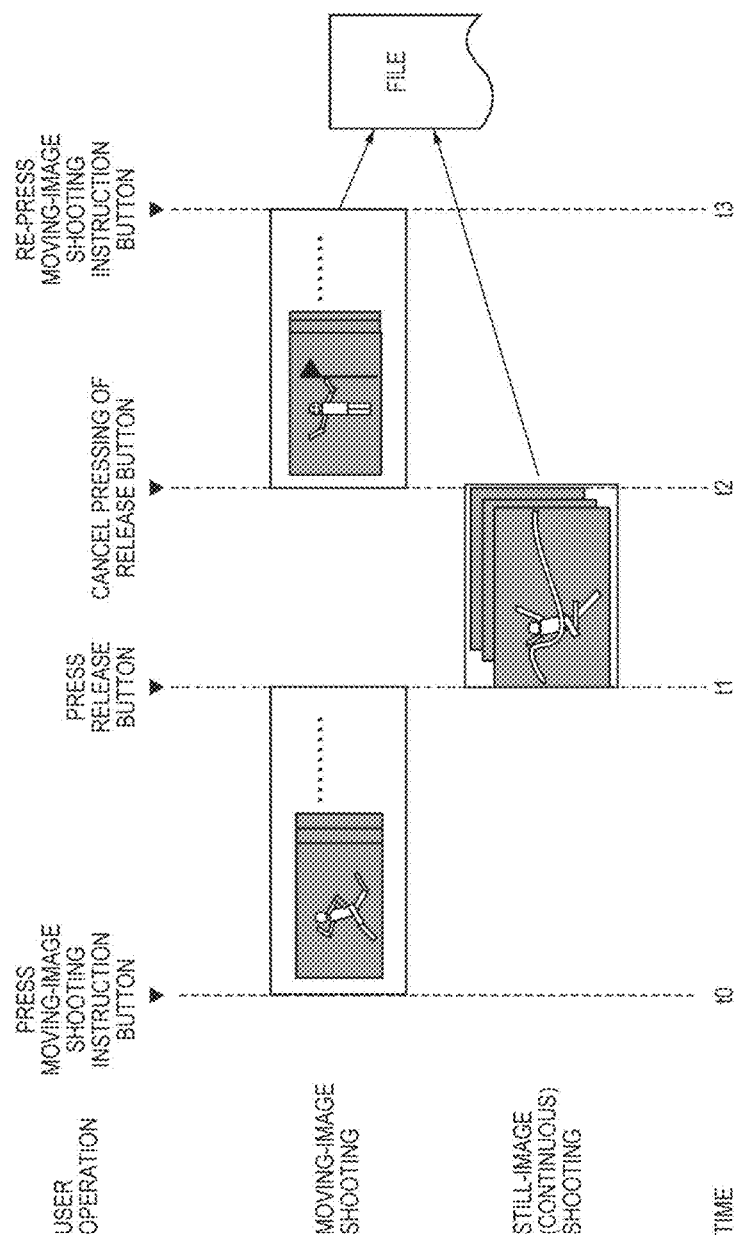

[Fig. 6]
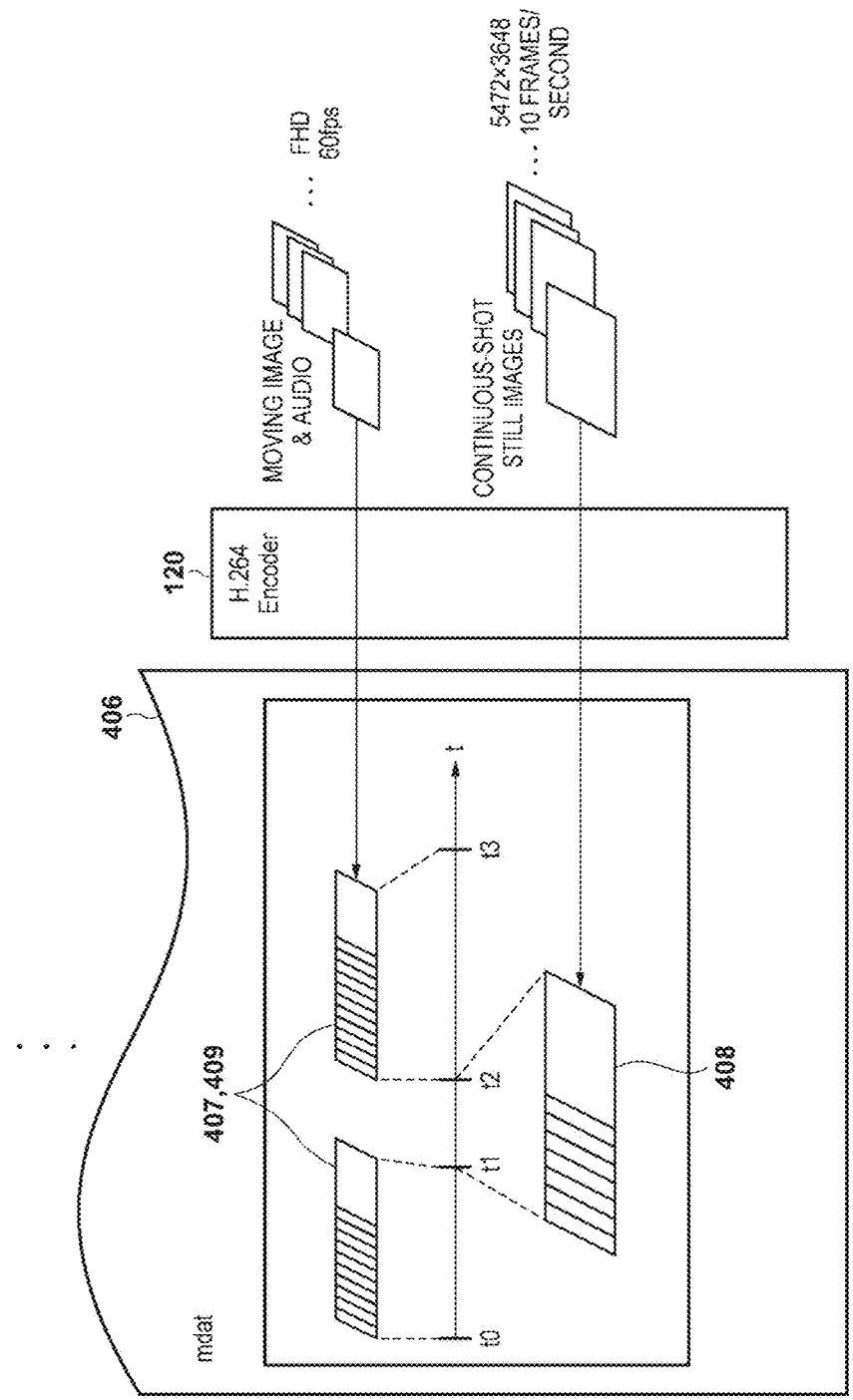

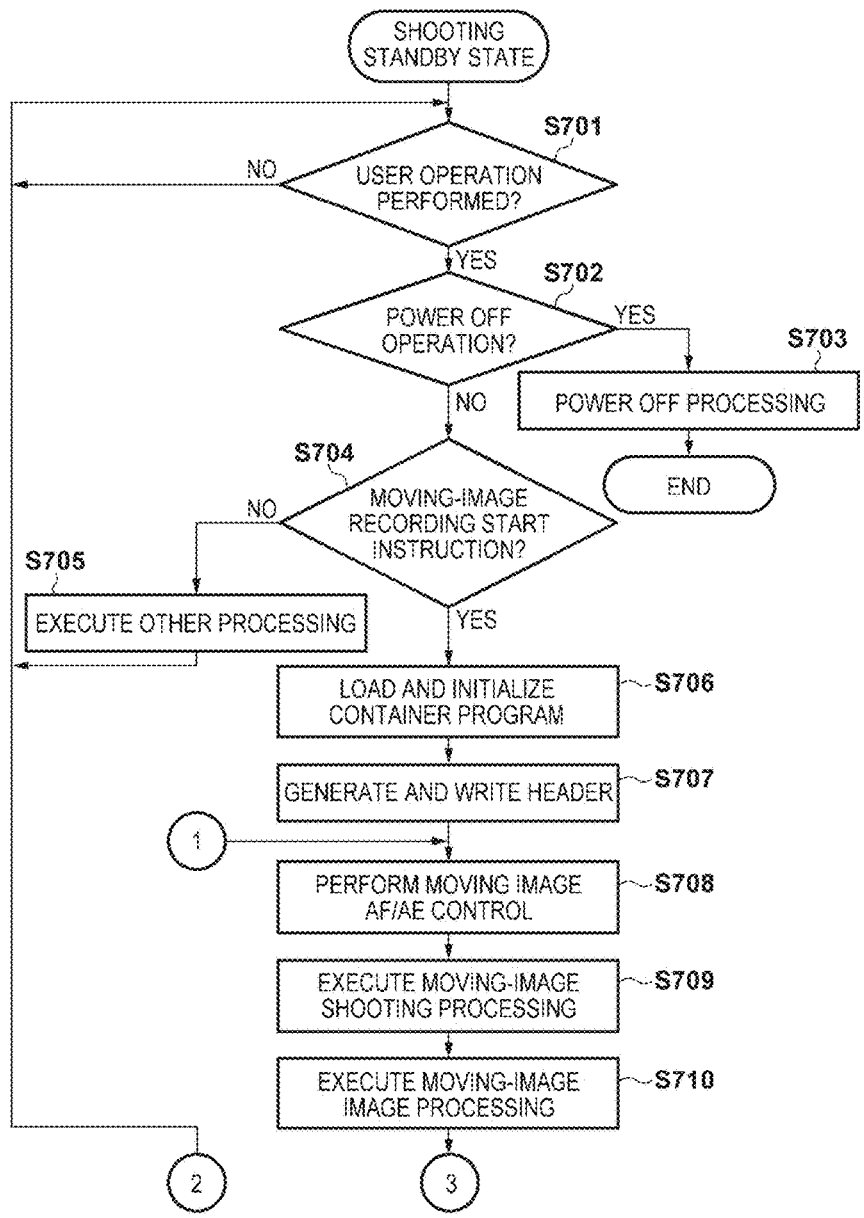

[Fig. 7B]
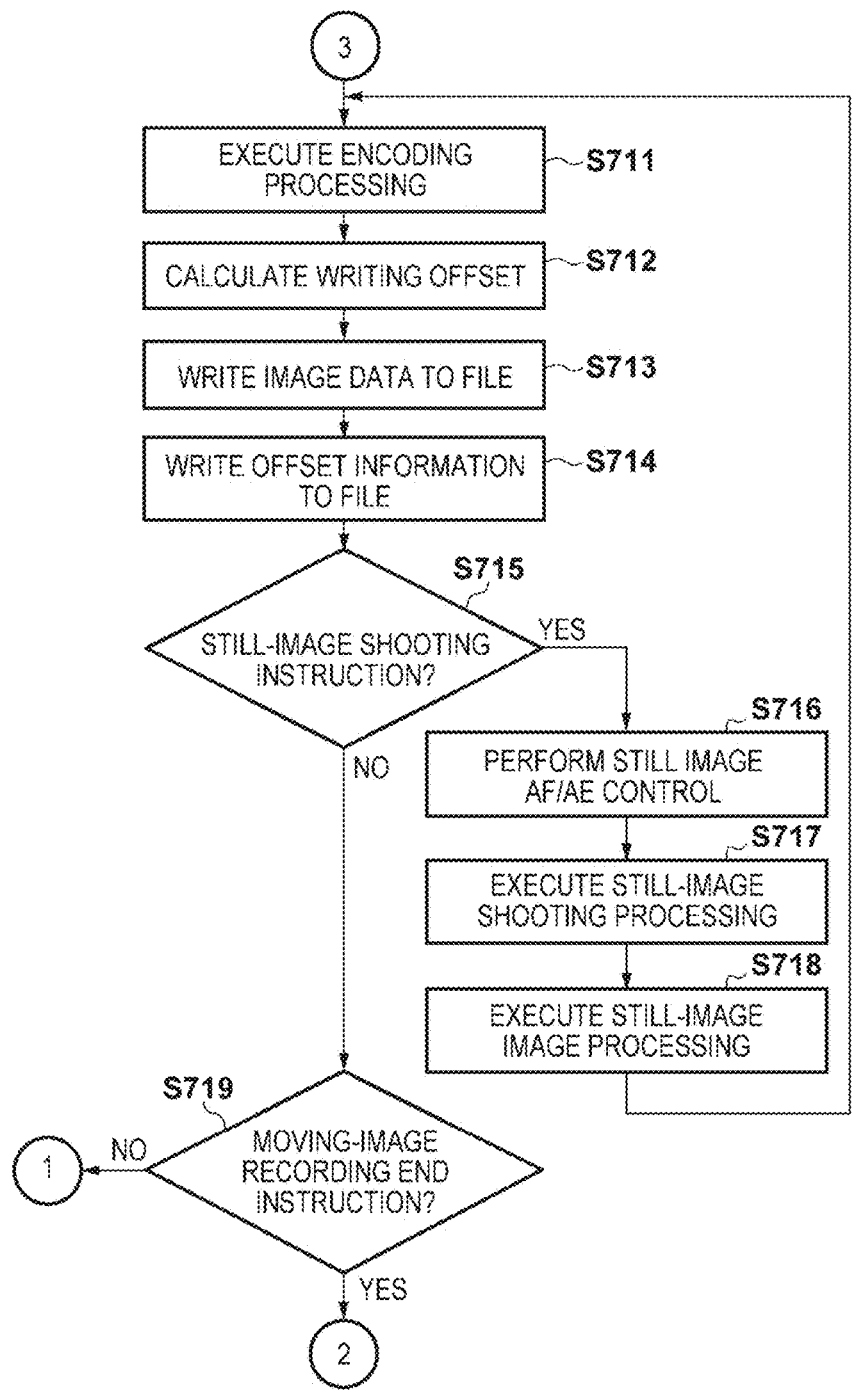

[Fig. 8]
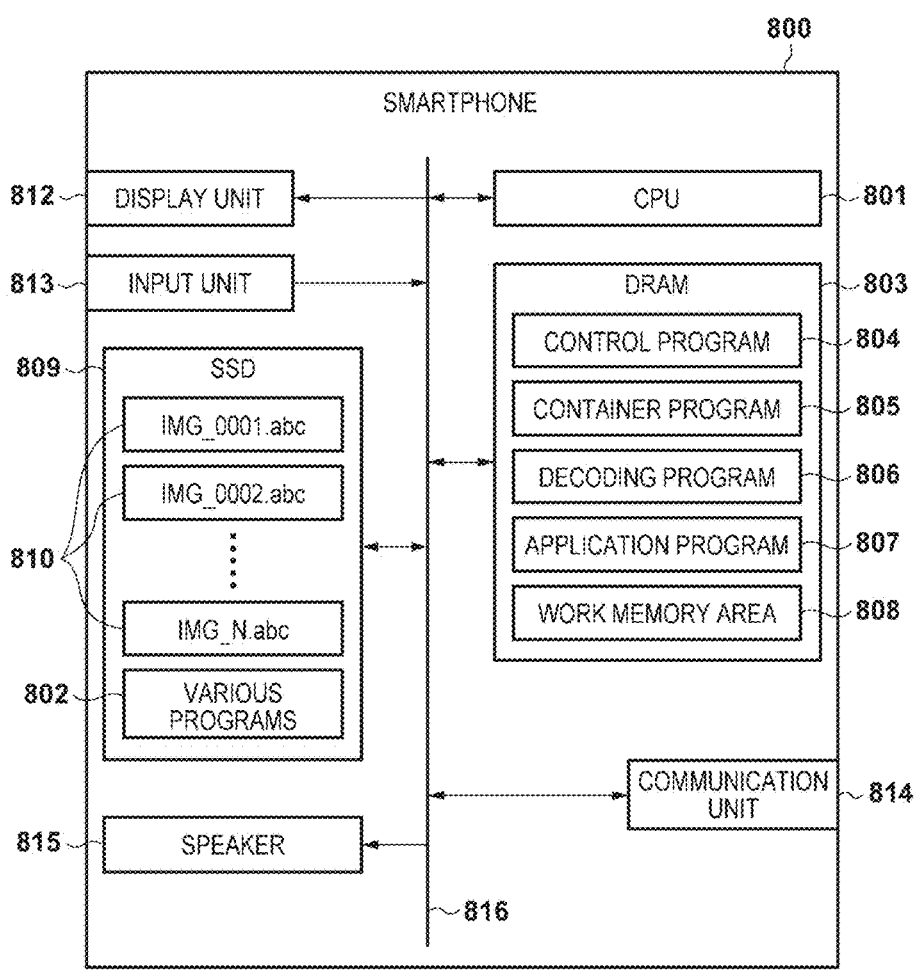

[Fig. 9]
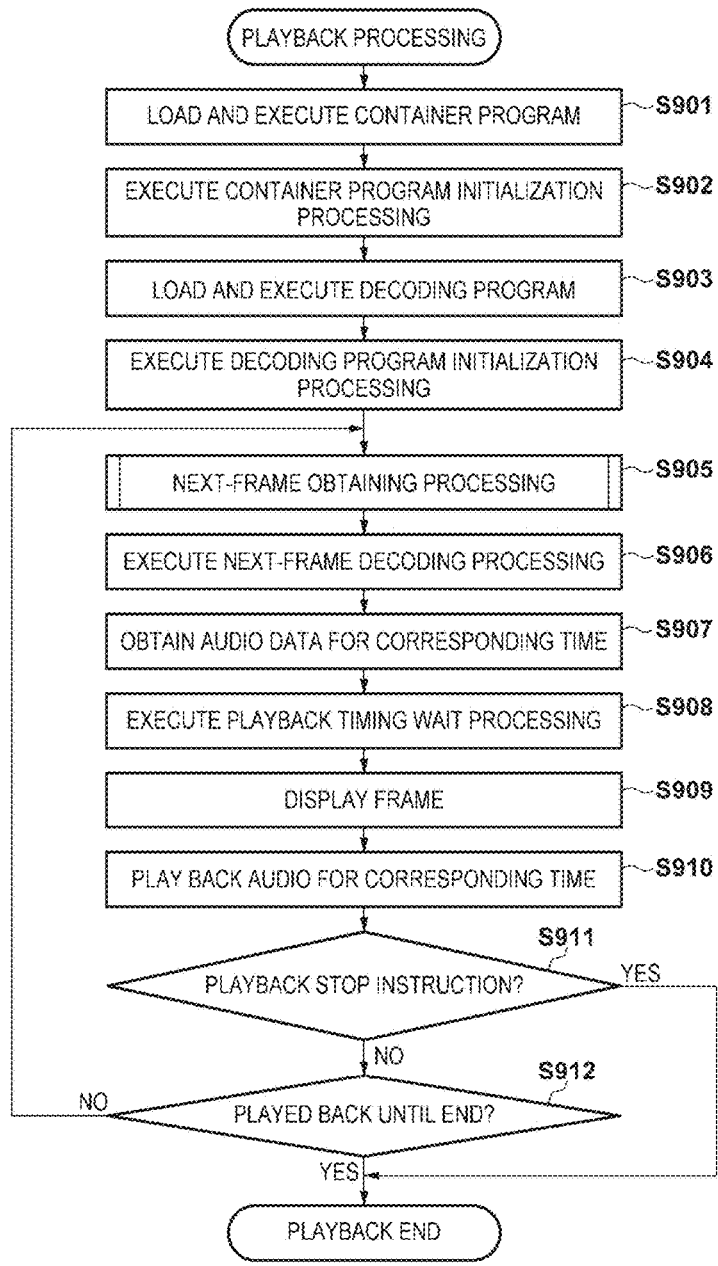

[Fig. 10]
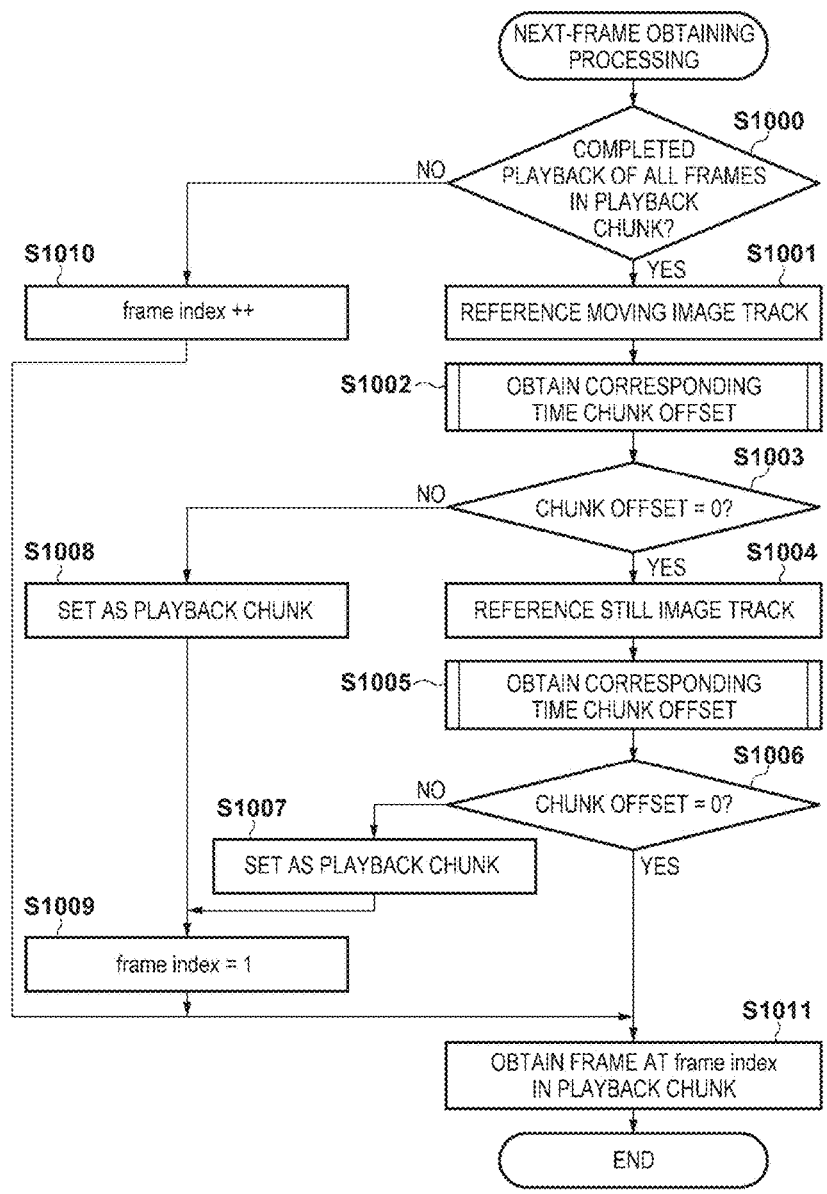

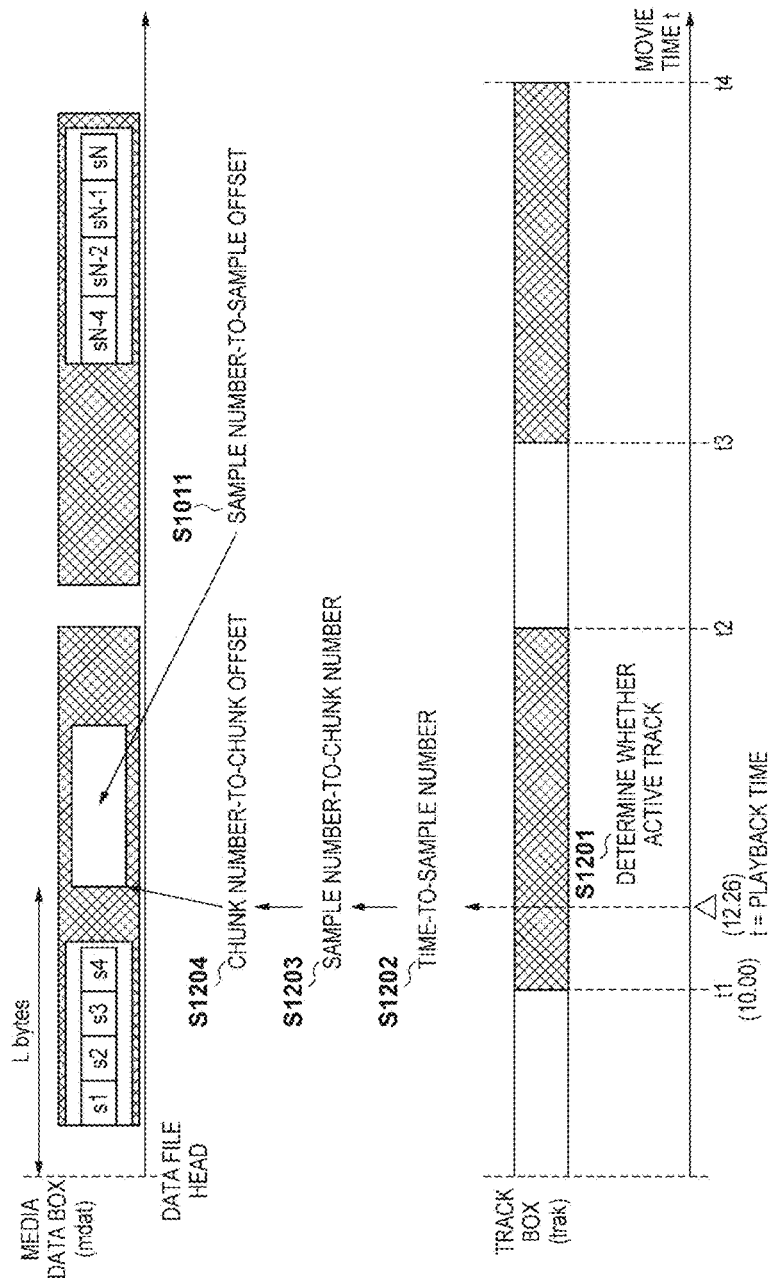

[Fig. 12]
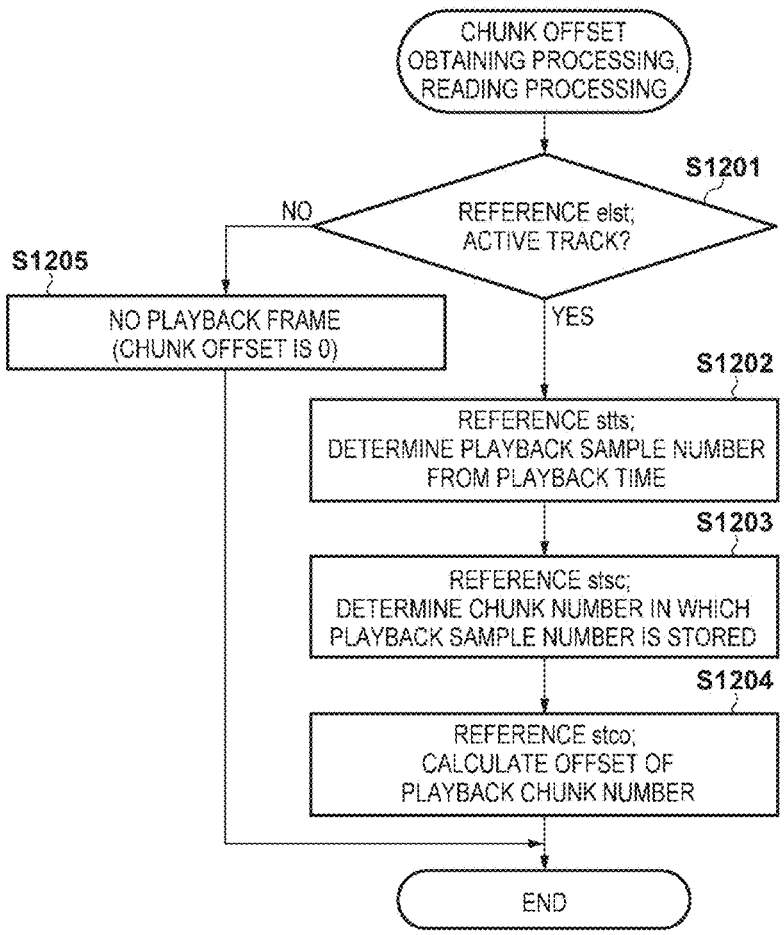

[Fig. 13]
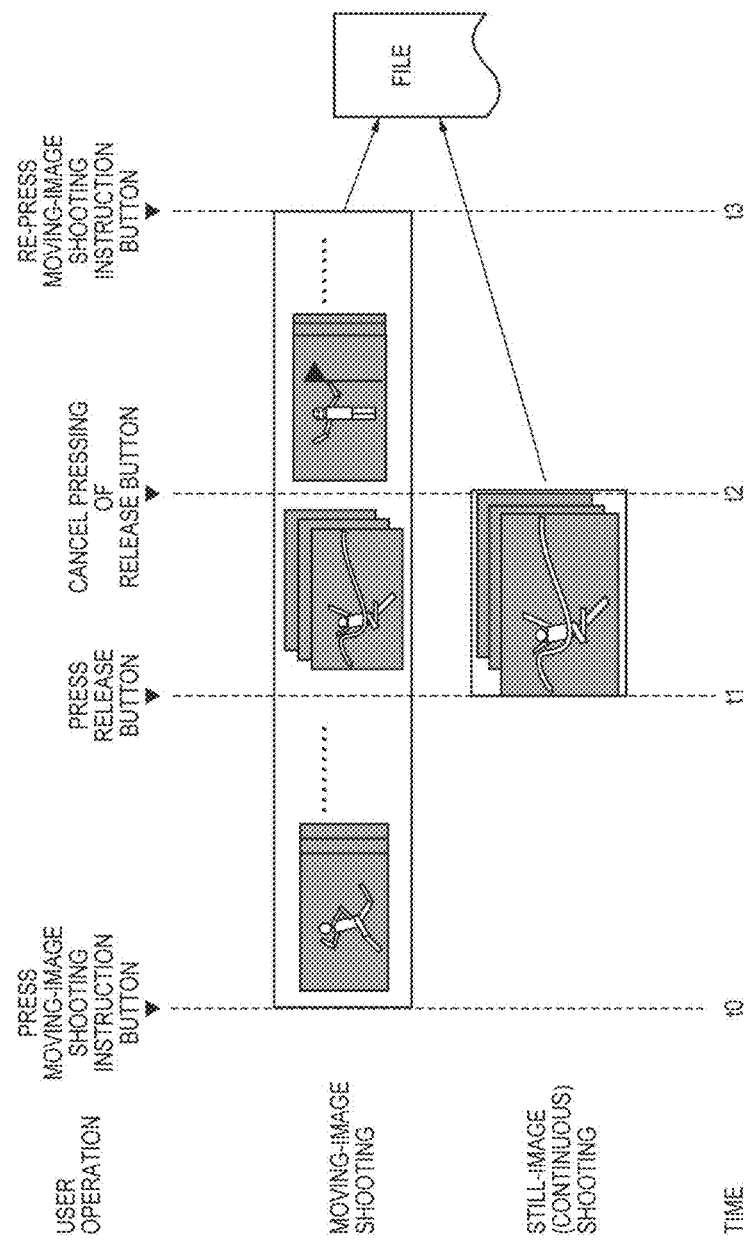

[Fig. 14]
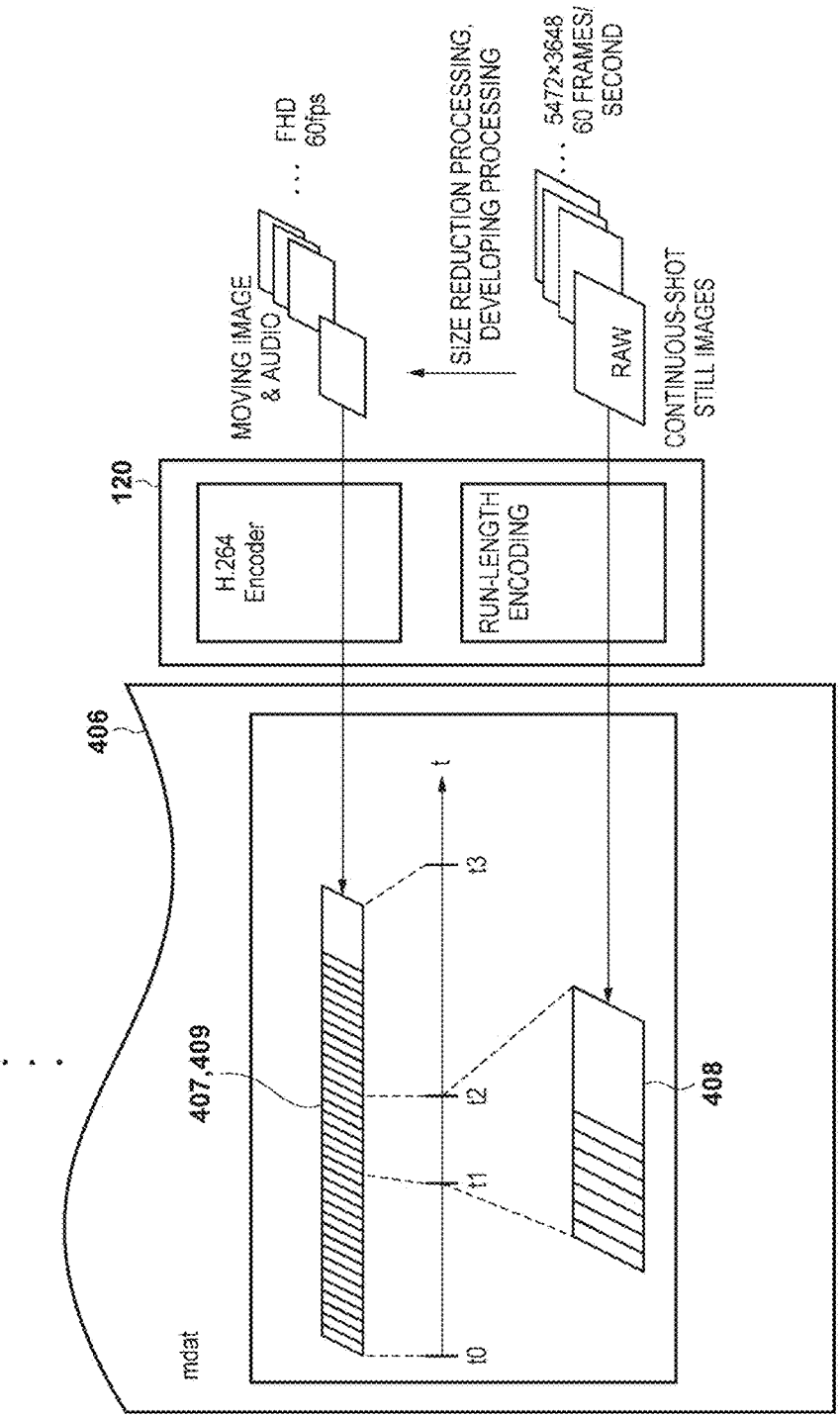

[Fig. 15]
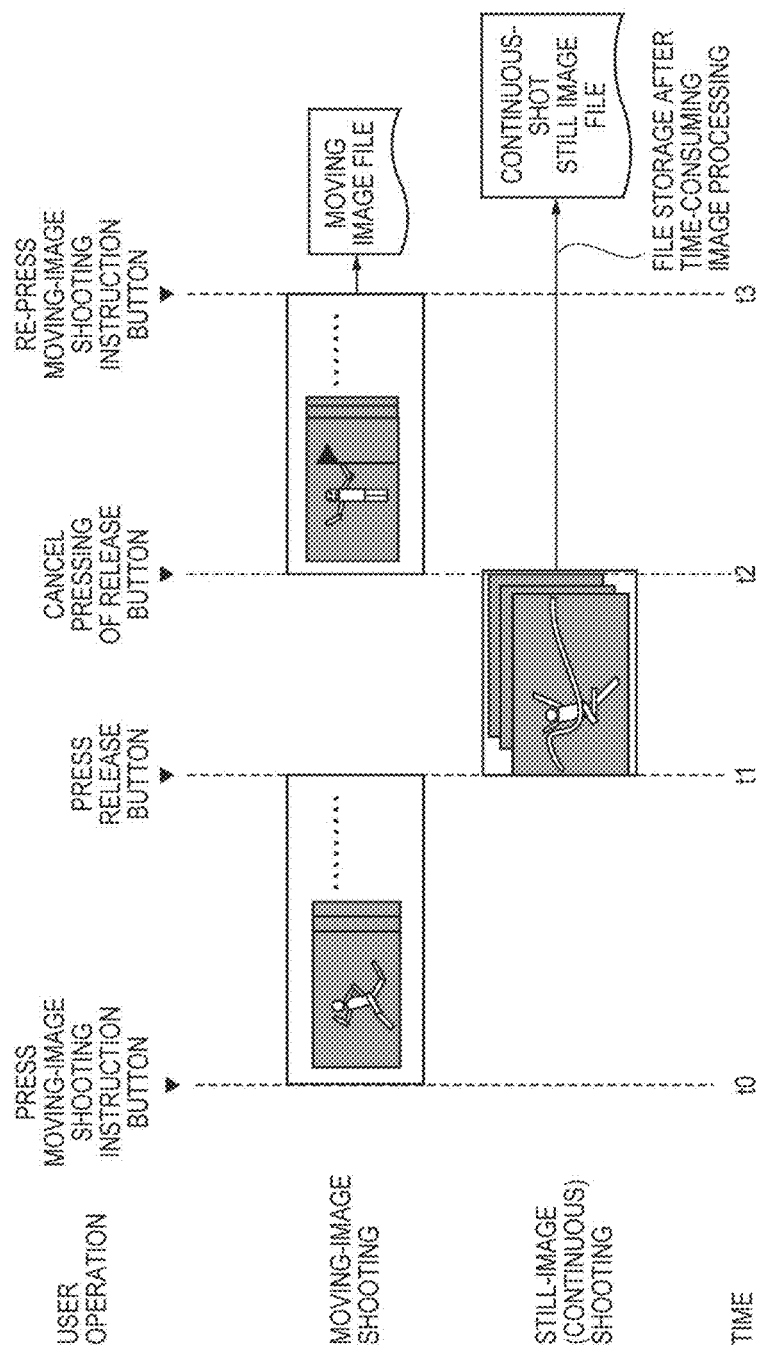

[Fig. 16A]
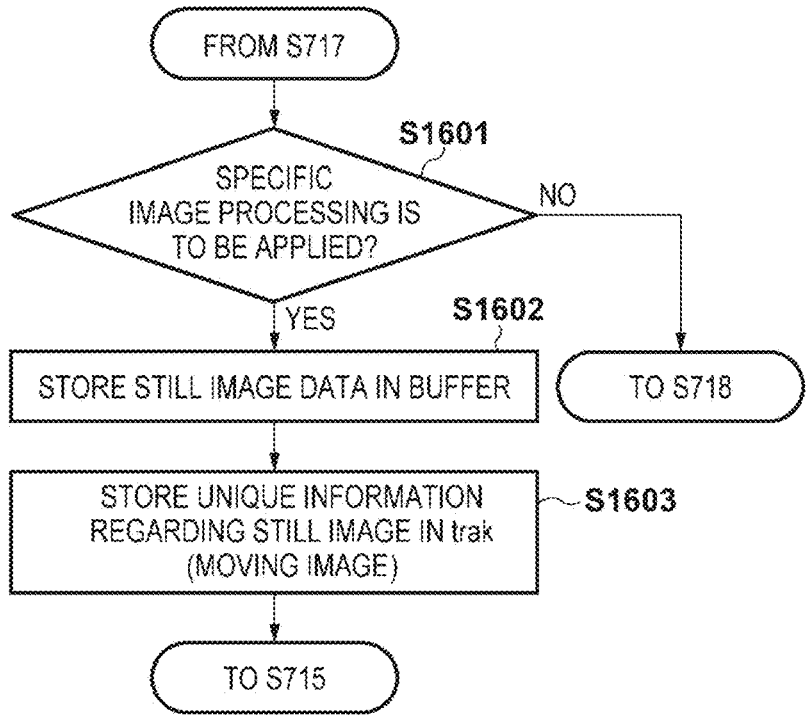
[Fig. 16B]
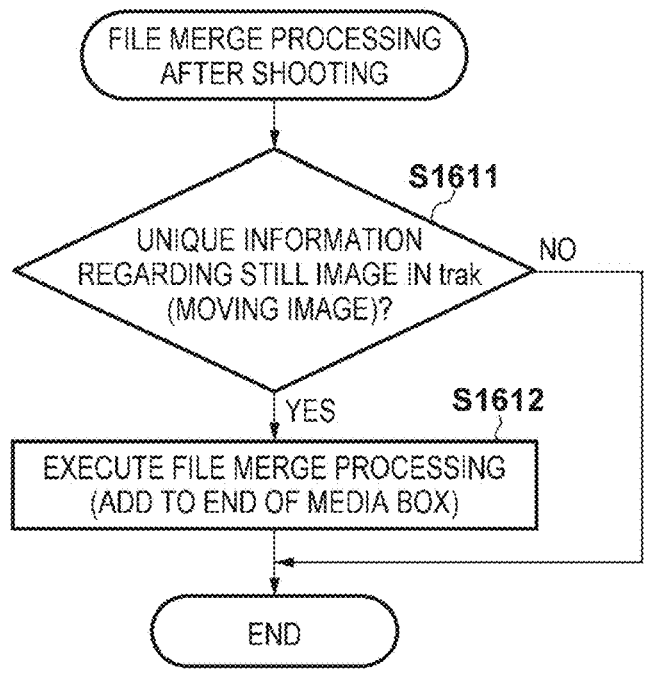

[Fig. 17A]
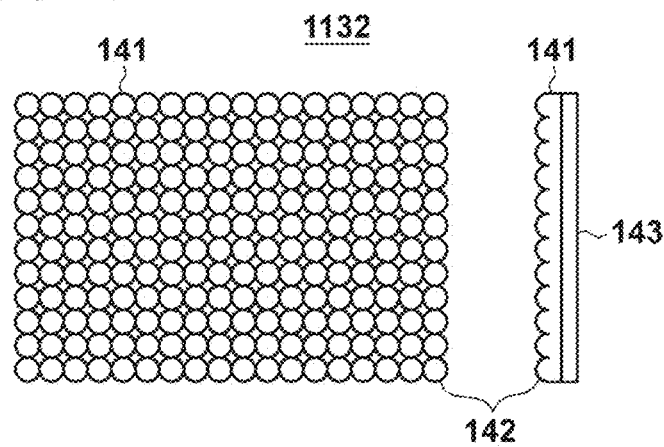
[Fig. 17B]
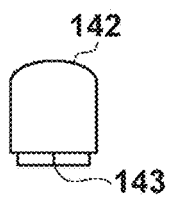
[Fig. 17C]
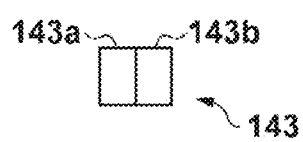
[Fig. 17D]
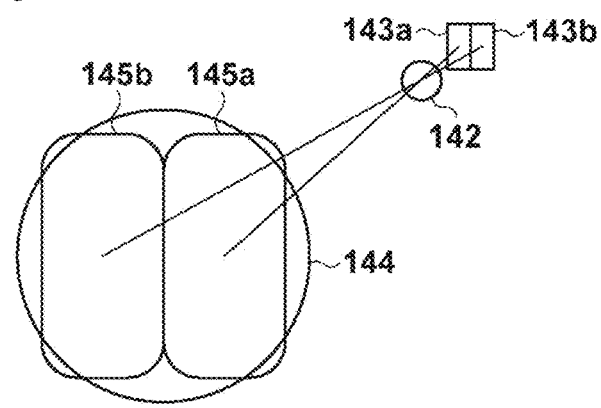
[Fig. 17E]
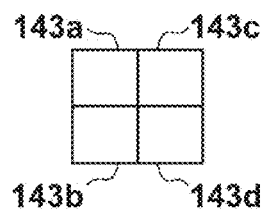

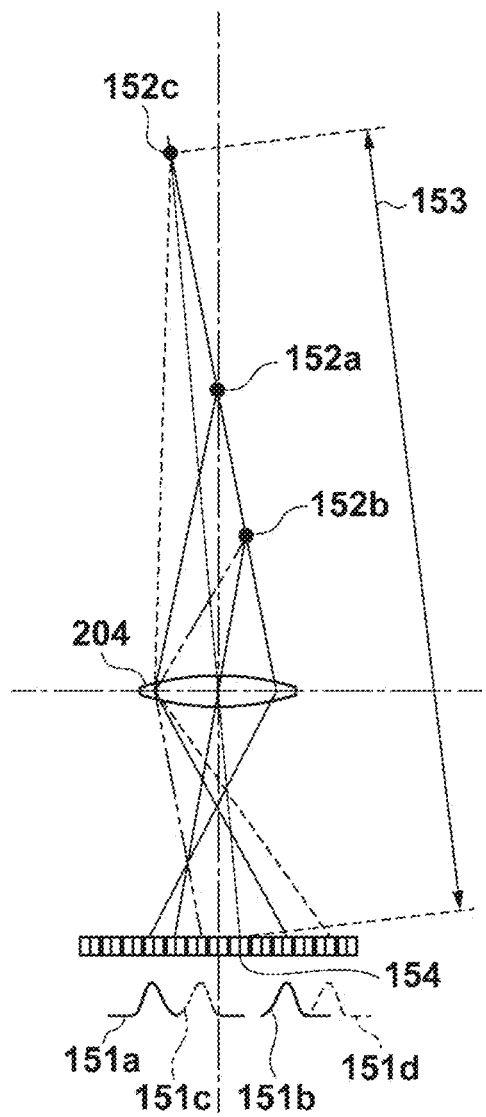
[Fig. 18]

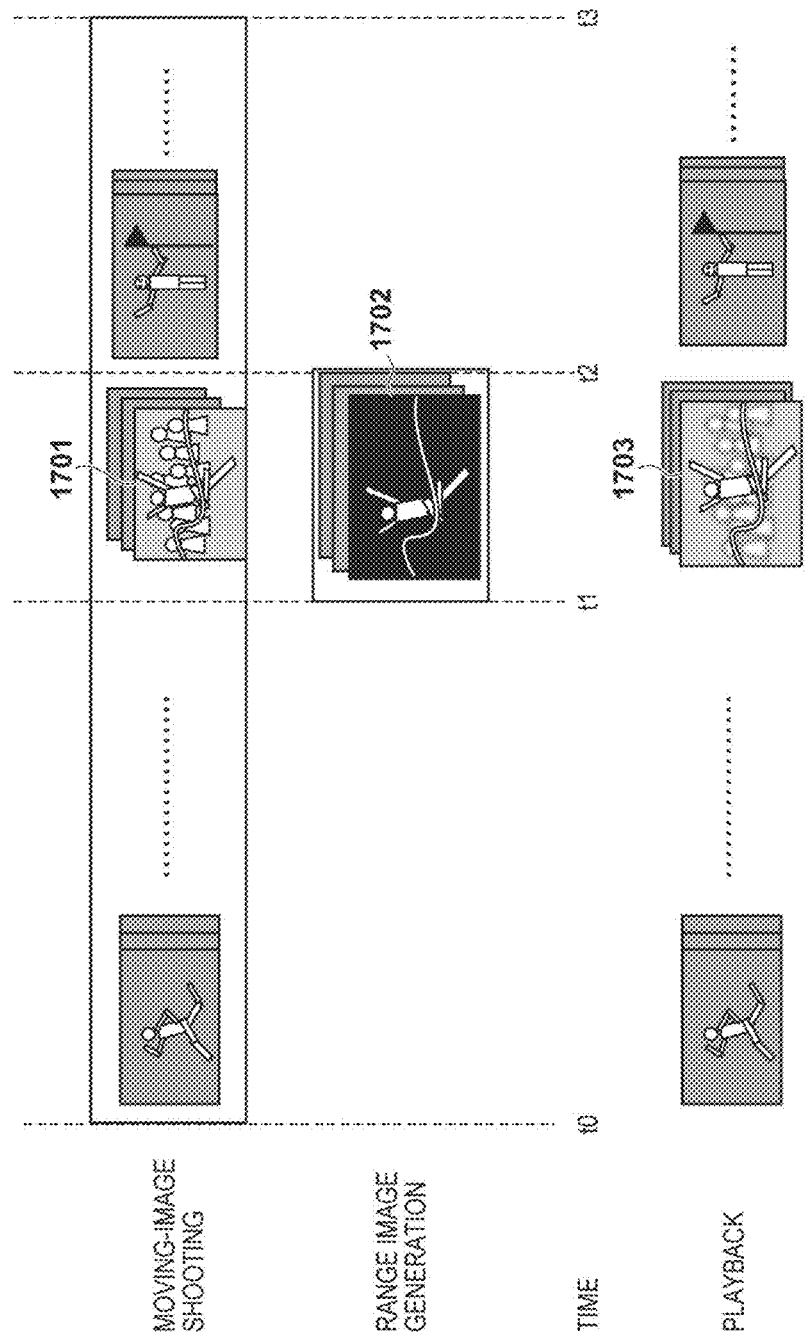
[Fig. 19]

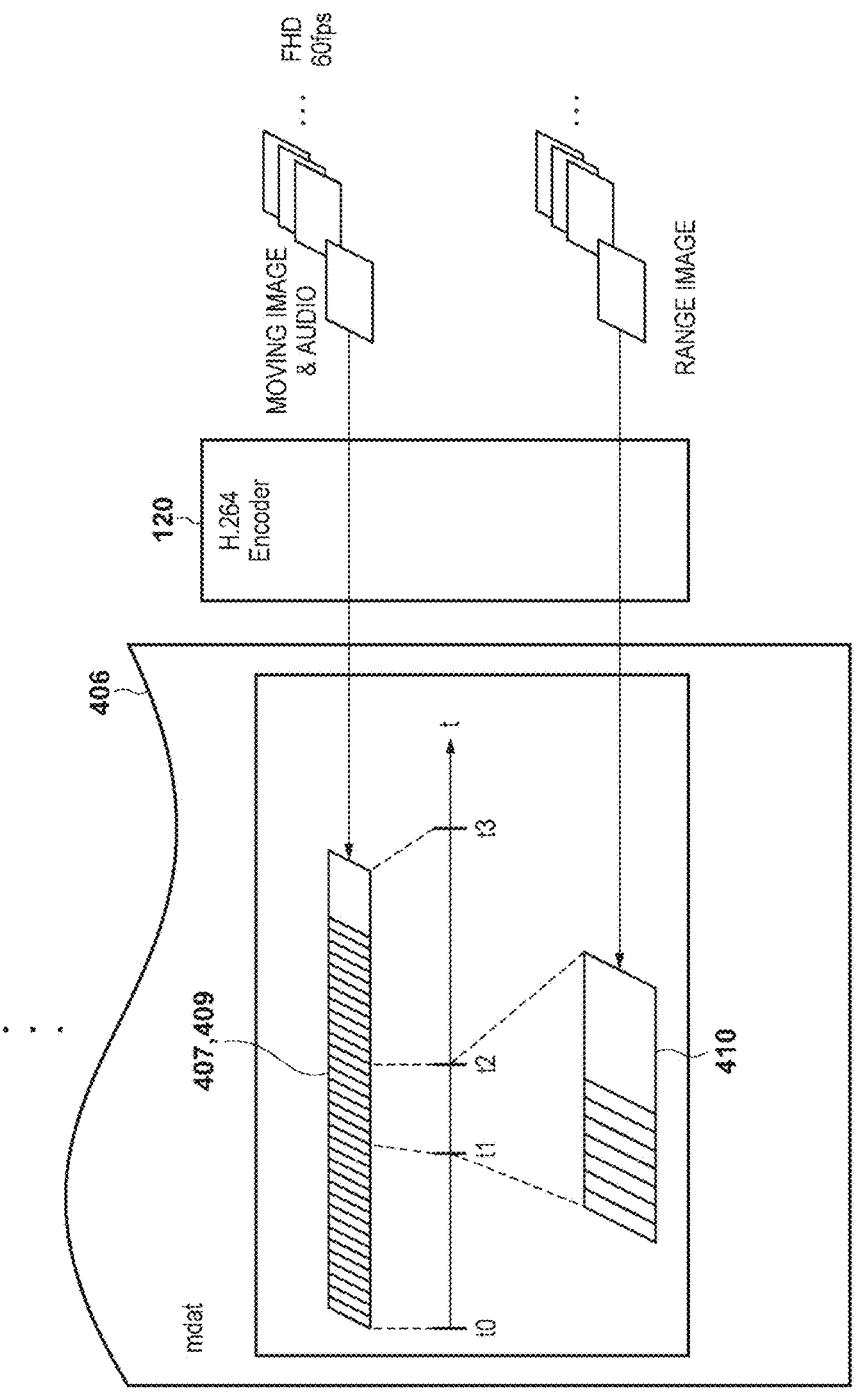
[Fig. 20]

[Fig. 21]
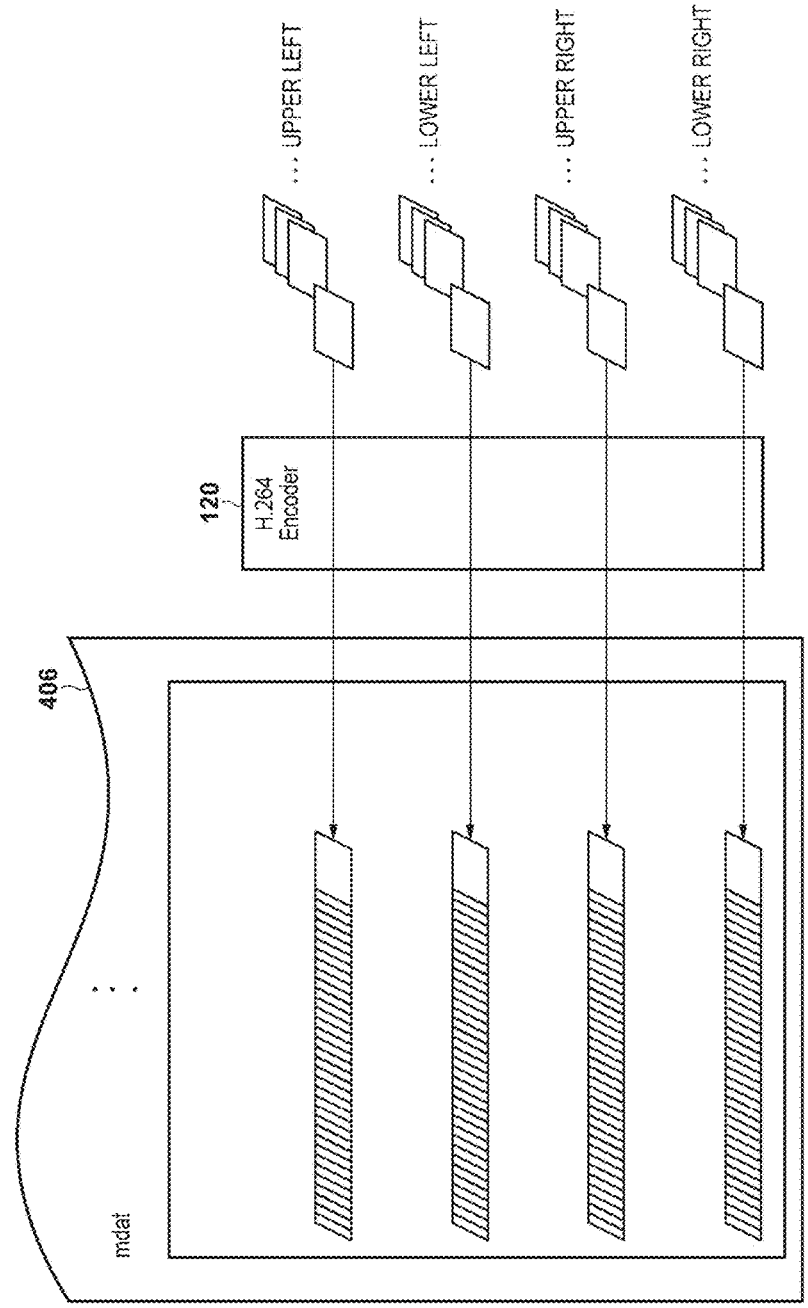

[Fig. 22]
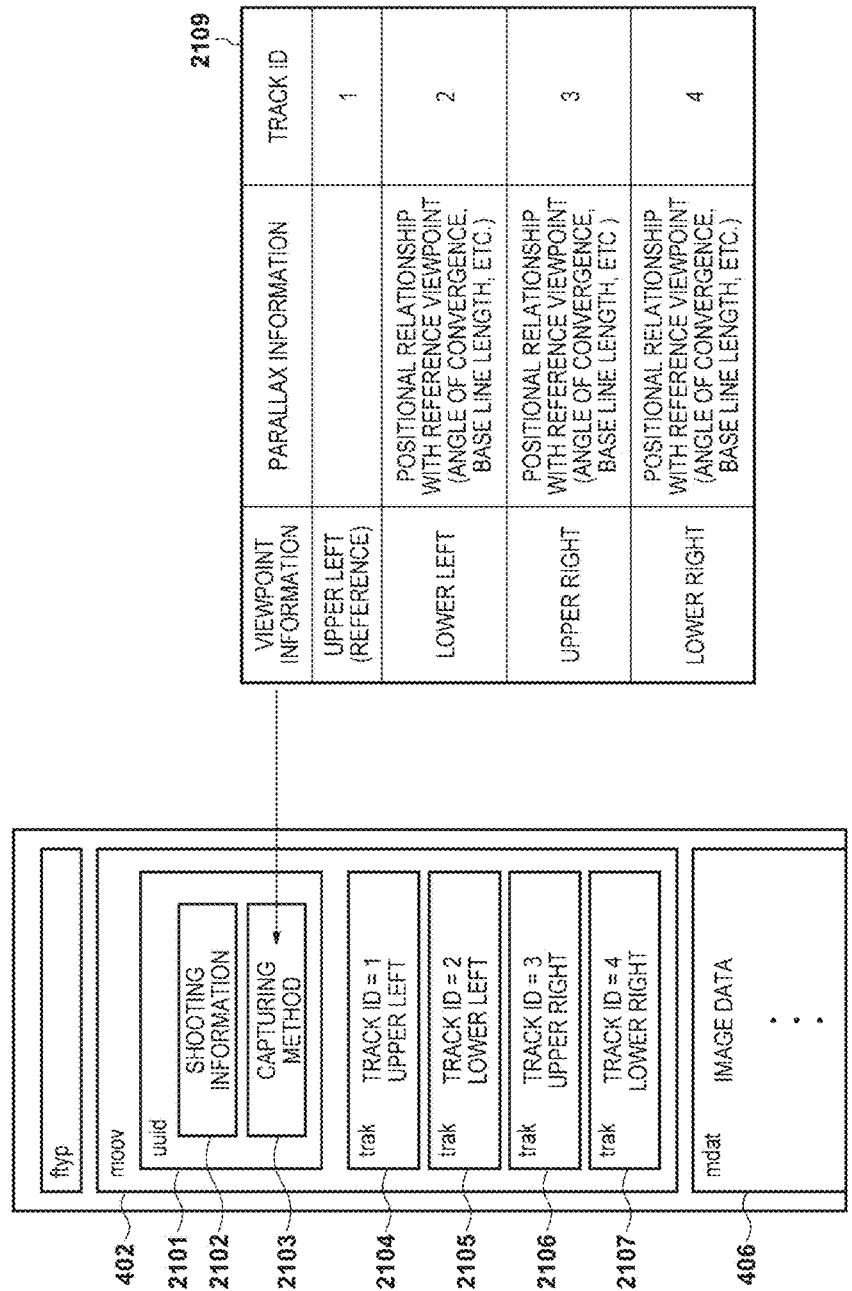

DATA RECORDING APPARATUS AND METHOD OF CONTROLLING THE SAME

CROSS-REFERENCE TO RELATED APPLICATIONS

This application is a national stage application of International Application No. PCT/JP2016/002989 filed Jun. 21, 2016, whose benefit is claimed and which claims the benefit of Japanese Patent Application No. 2015-130328, filed Jun. 29, 2015, the entire disclosure of which are incorporated herein by reference.

TECHNICAL FIELD

The present invention relates to a data recording apparatus and a method of controlling the same, and in particular relates to technology for storing data in a data file.

BACKGROUND ART

In recent years, the types of digital cameras and the functions thereof have become diversified, and the formats of recorded data have also similarly become diversified. Data files have been generated and recorded in distinct formats that correspond to a combination of an encoding format such as RAW or JPEG, and a format for expressing a scene (expression method) such as a still image, a moving image, or audio.

For example, with a digital camera that allows still-image shooting during moving-image shooting, moving image data and still image data that express the same scene are encoded with different systems to generate separate data files, which are then recorded to a recording medium.

In the case where pieces of related data are recorded as separate files, there is a possibility that some of the data files will be deleted or moved due to the need for a system for managing related data files, processing for searching for a file, or the like. In response to this issue, a multi-picture format has been defined for recording multiple pieces of still image data in the same file (CIPA DC-007-2009 "Multi-Picture Format", established on Feb. 4, 2009, [online], General Incorporated Association, Camera & Imaging Products Association. [found on May 19, 2015], Internet <URL: www.cipa.jp/std/documents/j/DC-007_J.pdf>).

However, the multi-picture format is directed to still image data, and cannot be used for the storage of data for an expression method other than a still image (e.g., moving image data). Accordingly, the multi-picture format cannot be used for storing multiple pieces of related moving image data in the same file, or storing related moving image data and still image data in the same file.

SUMMARY OF INVENTION

The present invention was achieved in light of the aforementioned issue in conventional technology, and provides a data recording apparatus that can generate a data file that can store various formats of data and has versatility, and a method of controlling such a data recording apparatus.

According to an aspect of the present invention, there is provided a data recording apparatus comprising: obtaining means for obtaining first image data and second image data, the second image data having a different expression method from the first image data; and recording means for storing, in a data file having a container structure, the first image data, the second image data, metadata regarding the first image data, and metadata regarding the second image data, and recording the data file, wherein the recording means stores the first image data and the second image data in the data file in the same container format.

According to another aspect of the present invention, there is provided a data recording apparatus comprising: obtaining means for obtaining a plurality of pieces of image data that include moving image data and reduced-size moving image data obtained by reducing a resolution of the moving image data; and recording means for storing, in a data file having a container structure, the plurality of pieces of image data and metadata regarding the plurality of pieces of image data, and recording the data file, wherein the recording means stores the plurality of pieces of image data in the data file in the same container format.

According to a further aspect of the present invention, there is provided a data recording apparatus comprising: obtaining means for obtaining a plurality of pieces of image data that include first image data and second image data having a different expression method from the first image data; and recording means for storing, in a data file having a container structure, the plurality of pieces of image data and metadata regarding the plurality of pieces of image data, and recording the data file, wherein the recording means stores the plurality of pieces of image data in the data file in the same container format.

According to another aspect of the present invention, there is provided an image capture apparatus comprising: the data recording apparatus according to the present invention; and an image sensor for obtaining the first image data and the second image data.

According to a further aspect of the present invention, there is provided a method of controlling a data recording apparatus, comprising: obtaining first image data and second image data, the second data having a different expression method from the first image data; and storing in a data file having a container structure, the first image data, the second image data, metadata regarding the first image data, and metadata regarding the second image data, and recording the data file, wherein in the storing, the first image data and the second image data are stored in the data file in the same container format.

According to another aspect of the present invention, there is provided a method of controlling a data recording apparatus, comprising: obtaining a plurality of pieces of image data that include moving image data and reduced-size moving image data obtained by reducing a resolution of the moving image data; and storing in a data file having a container structure, the plurality of pieces of image data and metadata regarding the plurality of pieces of image data, and recording the data file, wherein in the storing, the plurality of pieces of image data are stored in the data file in the same container format.

According to a further aspect of the present invention, there is provided a method of controlling a data recording apparatus, comprising: obtaining, a plurality of pieces of image data that include first image data and second image data, the second data having a different expression method from the first image data; and storing in a data file having a container structure, the plurality of pieces of image data and metadata regarding the plurality of pieces of image data, and recording the data file, wherein in the storing, the plurality of pieces of image data is stored in the data file in the same container format.

According to another aspect of the present invention, there is provided a program for causing a computer to function as the data recording apparatus according to the present invention.

According to a further aspect of the present invention, there is provided a data recording apparatus comprising: obtaining means for obtaining moving image data in a RAW format and still image data obtained from the moving image data; and recording means for storing, in a data file having a container structure, the moving image data, the still image data, metadata regarding the moving image data, and metadata regarding the still image data, and recording the data file, wherein the recording means stores the moving image data and the still image data in the data file in the same container format.

According to another aspect of the present invention, there is provided a data recording apparatus comprising: obtaining means for obtaining moving image data constituted by parallax images, and range image data obtained from the moving image data; and recording means for storing, in a data file having a container structure, the moving image data, the range image data, metadata regarding the moving image data, and metadata regarding the range image data, and recording the data file, wherein the recording means stores the moving image data and the range image data in the data file in the same container format.

Further features of the present invention will become apparent from the following description of exemplary embodiments with reference to the attached drawings.

BRIEF DESCRIPTION OF DRAWINGS

FIG. 1 is a block diagram showing an example of a functional configuration of a digital camera according to an embodiment.

FIG. 2 is a diagram schematically showing an example of the appearance of the rear of the digital camera according to the embodiment.

FIG. 3 is a diagram schematically showing a memory map of the digital camera according to the embodiment.

FIG. 4 is a diagram showing an example of a configuration of a data file generated by the digital camera according to the embodiment.

FIG. 5 is a diagram schematically showing an exemplary shooting sequence in the embodiment.

FIG. 6 is a diagram schematically showing exemplary data recording operations in the embodiment.

FIG. 7A is a flowchart showing a series of operations of the digital camera according to the embodiment.

FIG. 7B is a flowchart showing a series of operations of the digital camera according to the embodiment.

FIG. 8 is a block diagram showing an example of a functional configuration of a smartphone as one example of a playback apparatus for playing back a data file generated in the embodiment.

FIG. 9 is a flowchart showing playback processing operations of the smartphone according to the embodiment.

FIG. 10 is a flowchart showing details of next-frame obtaining processing carried out in step S905 in FIG. 9.

FIG. 11 is a diagram for describing chunk offset obtaining operations in the embodiment.

FIG. 12 is a flowchart for describing chunk offset obtaining operations in the embodiment.

FIG. 13 is a diagram schematically showing an exemplary shooting sequence in a second embodiment.

FIG. 14 is a diagram schematically showing exemplary data recording operations in the second embodiment.

FIG. 15 is a diagram schematically showing exemplary data recording operations in a third embodiment.

FIG. 16A is a flowchart for describing operations in the third embodiment.

FIG. 16B is a flowchart for describing operations in the third embodiment.

FIG. 17A is a diagram schematically showing an example of a configuration of an image sensor in a fourth embodiment.

FIG. 17B is a diagram schematically showing an example of a configuration of an image sensor in a fourth embodiment.

FIG. 17C is a diagram schematically showing an example of a configuration of an image sensor in a fourth embodiment.

FIG. 17D is a diagram schematically showing an example of a configuration of an image sensor in a fourth embodiment.

FIG. 17E is a diagram schematically showing an example of a configuration of an image sensor in a fourth embodiment.

FIG. 18 is a diagram for describing a range image generating method in the fourth embodiment.

FIG. 19 is a diagram schematically showing an exemplary shooting sequence in the fourth embodiment.

FIG. 20 is a diagram schematically showing exemplary data recording operations in the fourth embodiment.

FIG. 21 is a diagram schematically showing four-view moving image data recording operations in a fifth embodiment.

FIG. 22 is a diagram showing an example of a configuration of a data file in the fifth embodiment.

DESCRIPTION OF EMBODIMENTS

Exemplary embodiments of the present invention will now be described in detail in accordance with the accompanying drawings.

First Embodiment

The following describes an embodiment in which the present invention is applied to a digital camera serving as an example of a data recording apparatus, but the present invention can be carried out in any electronic device that has a shooting function or any electronic device that can manipulate image data files. Examples of such an electronic device include a video camera, a mobile phone (e.g., a feature phone or a smartphone), a tablet terminal, a personal computer (desktop, laptop, notebook, etc.), and a gaming device, but these are merely some examples.

FIG. 1 is a block diagram showing an example of the functional configuration of a digital camera 100 according to embodiments of the present invention, and FIG. 2 is a diagram schematically showing an example of the appearance of the rear of the digital camera 100. An image capturing unit 113 includes an imaging optical system 1131 and an image sensor 1132. Also, if the digital camera 100 has a mechanical shutter, the mechanical shutter is included in the image capturing unit 113. The mechanical shutter may be a focal plane shutter or a lens shutter.

The imaging optical system 1131 forms a subject optical image on the imaging surface of the image sensor 1132. The angle of view (focal length) and the focus distance (focus lens position) of the imaging optical system 1131 are controlled by a CPU 101. The image sensor 1132 is a CMOS image sensor, for example. Charge accumulation operations and readout operations performed by the image sensor 1132 are also controlled by the CPU 101. Note that the image capturing unit 113 may be configured to be capable of obtaining parallax images such as stereo images. In this case, it may have a so-called multi-eye configuration having multiple combinations of the imaging optical system 1131 and the image sensor 1132, or may have a configuration in which one imaging optical system 1131 and one image sensor 1132 are provided, and parallax images can be obtained by the image sensor 1132. In the latter case, the image sensor 1132 can have a configuration in which one microlens is shared by multiple photoelectric conversion portions, for example. If such an image sensor 1132 is used, it is also possible to perform imaging plane phase difference AF. Note that the imaging optical system 1131 may be removable, as with an interchangeable lens.

The CPU 101 is the control portion of the digital camera 100, and by loading programs stored in a ROM 102 to a DRAM 103 and executing them, the CPU 101 controls function blocks of the digital camera 100 and realizes functions of the digital camera 100. Later-described data recording processing is also realized by control performed by the CPU 101.

The ROM 102 is a nonvolatile memory that stores programs executed by the CPU 101, various types of setting values, initial values, GUI data, and the like, and at least a portion can be rewritable.

The DRAM 103 is a volatile memory, and is used as a temporary storage area, such as work area for the CPU 101 and a buffer memory.

A real-time clock 104 is an internal clock of the digital camera 100, and provides the year, month, day, hour, minute, second, day of the week, and the like. It is used for calibration of an event timer of the CPU 101 and for timestamp generation.

A memory card interface (IF) 105 is a reader/writer for a memory card 106, which is one example of a recording medium, and has a card slot for mounting the memory card 106. The reading and writing of data from and to the memory card 106 via the memory card IF 105 is controlled by the CPU 101.

An operation unit 107 is a group of input devices for the user to give various instructions to the digital camera 100 and perform setting. It generally includes buttons, switches, a touch panel, a dial, or the like, but there is no limitation to physical input means, and it may include a configuration for realizing audio input, eye-gaze input, or the like.

In FIG. 1, a power supply button 108, various menu buttons 109 (combination of a menu button, an arrow key, a determine/execute key, etc.), a release button 110, a moving-image shooting instruction button 111, and a playback mode button 112 are shown as portions of the operation unit 107.

A communication unit 114 is a wired and/or wireless communication interface for the digital camera 100 to communicate with external devices. The communication unit 114 generally supports the USB and HDMI (registered trademark) standards for wired communication, and the Bluetooth (registered trademark) and IEEE 802.11 standards for wireless communication, but there is no limitation to these standards.

A signal processing processor 118 is a microprocessor specialized for signal processing and image processing, and in the present embodiment it realizes the functions of an image processing unit 119 and a compression/decompression unit (codec) 120. The image processing unit 119 carries out general image processing in the digital camera. Specific examples of this image processing include A/D conversion, noise removal, demosaic (color interpolation) processing, white balance adjustment processing, optical distortion correction, tone correction, color space conversion, resolution conversion, subject detection (face detection), and AF evaluation value calculation, but there is no limitation to these examples. The compression/decompression unit 120 executes encoding processing and decoding processing on data in accordance with a predetermined format. There are no limitations on the encoding formats supported by the compression/decompression unit 120, and it supports one or more encoding formats that support different methods for expressing scenes, such as a moving image and a still image. Examples of such encoding formats include H.264 (or HPEG-4 AVC), H.265 (or HEVC), and Motion JPEG, but there is no limitation to these examples. Also, the compression/decompression unit 120 supports encoding formats generally supported by digital cameras, such as the JPEG format, and manufacturer proprietary formats such as RAW compression formats.

Note that although not shown in FIG. 1, the digital camera 100 is provided with a sound collection device (microphone), and audio input from the microphone is also subjected to A/D conversion by the image processing unit 119 and subjected to encoding processing and decoding processing by the compression/decompression unit 120.

A display unit 121 is a liquid crystal display (LCD), for example, and may be provided with a touch panel. Software keys and buttons that make up a portion of the operation unit 107 may be realized by combining the touch panel and a GUI display on the display unit 121. During shooting standby and during moving-image shooting, the moving image being shot is displayed on the display unit 121 in real-time, thus making it possible to use the display unit 121 as an electronic viewfinder. The display unit 121 also displays menu screens for performing setting, displays states and setting values of the digital camera 100, and displays image data stored in the memory card 106, for example.

The function blocks described above are connected to each other via a bus 122, thus making control by the CPU 101 and communication between the function blocks possible. Note that among the function blocks of the digital camera 100, FIG. 1 schematically shows only the function blocks that are necessary for describing the embodiments.

The digital camera 100 of the present embodiment enters a still-image shooting standby state when the power supply is turned on by an operation performed on the power supply button 108. Specifically, the CPU 101 controls the image capturing unit 113 and the signal processing processor 118, and starts moving-image shooting and operations for displaying the captured moving image on the display unit 121 in real-time. Accordingly, the display unit 121 starts to function as a viewfinder. Note that the moving image being shot here is for display, and thus has a resolution that corresponds to the resolution of the display unit 121, which is lower than the resolution of a moving image for recording.

The CPU 101 also drives the focus lens of the imaging optical system 1131 based on an AF evaluation value generated by the image processing unit 119, and performs automatic focus detection (AF) such that the center of the screen is focused on. The CPU 101 furthermore performs automatic exposure control (AE) for determining appropriate exposure conditions (accumulation period or electronic shutter speed, and gain, etc.) based on captured image luminance information calculated by the image processing unit 119.

When a shooting preparation instruction, such as half-pressing the release button 110, is input, the CPU 101 executes AF processing and AE processing for still-image shooting. Specifically, the CPU 101 drives the focus lens to a position for focusing on the set focus detection area, and determines exposure conditions (aperture value, shutter speed, shooting sensitivity). Note that AF processing can be carried out using a known method such as a contrast method, a phase difference method, or a combination of a contrast method and a phase difference method. The phase difference method can be used in the case where the image sensor 1132 has a structure capable of generating phase difference focus detection signals. If the image sensor 1132 has a general configuration, the contrast method can be used. A sensor for realizing phase difference-type AF (phase difference AF) may be provided separately. Here, it is assumed that AF processing is executed by the CPU 101 determining a focus lens position based on AF evaluation values (contrast evaluation values or defocus amounts) calculated by the image processing unit 119, and driving the focus lens to the determined position.

AE processing can also be performed using a known method. For example, in the case where face detection is performed by the image processing unit 119, exposure conditions may be determined such that a detected face is exposed appropriately. Alternatively, exposure conditions may be determined according to the set photometry mode, such as center-weighted photometry or spot photometry. In either case, it is assumed that the CPU 101 determines exposure conditions based on luminance information calculated by the image processing unit 119 in the present embodiment.

FIG. 3 is a diagram schematically showing a memory map of the DRAM 103 during operation of the digital camera 100. When the power supply of the digital camera 100 is turned on, the CPU 101 loads programs from the ROM 102 to the DRAM 103, and executes the loaded programs. In the present embodiment, the CPU 101 realizes functions of the digital camera 100 by executing a basic control program 301, a shooting control program 302, and a container program 303.

The basic control program 301 realizes processing related to user input and output performed via the operation unit 107, basic user interface processing, file I/O processing, and the like. Also, the shooting control program 302 is a program for realizing various functions related to the shooting of moving images and still images, and is mainly related to timing control and control of the operation content of the image capturing unit 113 and the signal processing processor 118.

The container program 303 is a program for realizing operations by which image data obtained by shooting and data generated based on such image data (e.g., a range image) are stored in a data file having a later-described specific format, and recorded to the memory card 106. Also, in accordance with a determination to search for data when playback is to be performed, the container program 303 searches for desired data in a data file and searches for metadata necessary for playback. The container program is also called a parser program.

A work memory area 304 shown in FIG. 3 is a memory space not for storing a program, but rather for temporarily storing variables and the like necessary for the execution of a program.

FIG. 4 is a diagram showing an example of the configuration of a data file generated by the digital camera 100 of the present embodiment. The data file of the present embodiment has versatility, and has a configuration that conforms to a file format that has a container structure and allows pieces of image data having different scene expression methods, such as moving image data (first image data) and still image data (second image data), to be stored in one file. Specifically, the data file has a container structure that conforms to the ISO base media file format (ISO/IEC 14496-12) or a format that compatible therewith. Another feature is that data of different expression methods can be stored in a common container format. This means that data of different expression methods can be obtained from one data file based on the same determination.

The ISO base media file format has a container structure made up of a container box and sub boxes stored in the container box. In FIG. 4, a data file 400 is the container box at the top level, and stores a file type box (ftyp) 401, a movie box (moov) 402, and a media data box (mdat) 406. The movie box 402 stores track boxes (trak) 403 to 405. The media data box 406 stores actual data.

Note that in the ISO base media file format, actual data is managed in units called samples, chunks, and tracks. A track includes an image sequence and an audio sequence, and is a collection of samples. A sample is an individual video frame, a time-contiguous group of video frames, or a time-contiguous compressed section of audio. Also, a chunk is contiguous set of samples for one track, and is a management unit of actual data that is stored in the media data box 406. For details regarding the ISO base media file format, see the ISO/IEC 14496-12 specification.

Accordingly, a moving image data stream 407, a continuous-shot still image data stream 408, and an audio data stream 409 in the media data box 406 in FIG. 4 are each managed with a common unit of time. The start address of each chunk of actual data for a certain track is managed by an absolute offset (chunk offset) from the head of the file. Note that when not in a continuous shooting period, the continuous-shot still image data stream 408 has no data, and when in a continuous shooting period, it stores pieces of still image data as moving image frames having a frame rate that corresponds to the number of images shot per second.

The file type box 401 contains a four-letter identifier (brand) that identifies the type of data file. The identifiers are in accordance with a registration system, and are managed internationally.

The movie box 402 is a container box that stores metadata (management information) regarding the actual data stored in the media data box 406.

The movie box 402 contains the following.

mvhd (movie header): creation time, modification time, time scale, length (duration), playback rate, volume, etc.

trak (track): container box for a single track

Each track box (trak) contains the boxes shown below, and stores values that correspond to predetermined setting values. These boxes and stored information are defined by standards, and therefore will not be described in detail here.

tkhd (track header): flags (enabled or not, etc.), creation date, modification date, track ID, length (duration), layer, volume, track width and height, etc.

edts (edit): container box that stores an edit list elst (edit list): stores a timeline map. Each entry defines part of the track time-line. Entry count, track duration (duration of edit segment), media time (start time of edit segment), media rate (playback rate)

mdia (media): container box that stores boxes related to media data in a track mdhd (media header): information that is media-independent, and relevant to characteristics of the media in a track (creation date, modification date, time-scale, length, language, etc.)

hdlr (handler reference): media handler type (track type), human-readable name for the track type, etc.

minf (media information): container box that stores characteristic information of the media in the track vmhd/smhd/hmhd/nmhd (media information header): one provided for each type of track. Information independent of the coding, such as the version.

dinf (data information): container box that stores a box regarding the location of the media information in a track dref (data reference): version, actual entry count, entry format version, data entry name (URN) or data entry location (URL)

stbl (sample table): sample table that contains all the time and data indexing of the media samples in a track stsd (sample description): detailed information and initialization information regarding the encoding format stts (decoding time to sample): table for conversion from decoding time to sample number stsc (sample to chunk): information for finding the chunk that contains a sample based on that sample (number of samples per chunk, etc.)

stsz (sample size): sample count and data size (in bytes) of each sample stco (chunk offset): table of location information for each chunk in a file Note that for simplification, FIG. 4 shows only the track boxes 403 to 405 for each of the data streams stored in the media data box 406. Note also that boxes other than the boxes described above may be contained in the movie box 402 and the track boxes 403 to 405.

In the present embodiment, the track boxes 403 to 405 respectively store metadata regarding moving image data, still image data, and audio data stored in the media data box 406.

Note that the track box has a configuration for basically handling data in a time sequence, and therefore the parameter representing the frame rate is adjusted in the case of being used for still image data as described above. For example, in the case of pieces of data for still images that were shot continuously, a value that corresponds to the continuous shooting speed (shots or frames/sec) is set as the frame rate parameter value.

Note that a chunk offset is stored for each chunk, and a chunk offset for a chunk not having actual data is set to an implausible value, thus making it possible to identify that actual data does not exist when referencing the chunk offset box. In the present embodiment in which all of the media data is stored in one file, the value "0", for example, can be used as an implausible chunk offset.

Digital Camera Operation Flow

Next, a series of shooting-related operations of the digital camera 100 will be described with reference to the flowchart shown in FIGS. 7A and 7B. The processing shown in FIGS. 7A and 7B starts at the time when the power supply of the digital camera 100 is turned on by an operation performed on the power supply button 108, and the digital camera 100 is operating in the shooting standby state. Hereinafter, for the sake of convenience, processing realized by the CPU 101 executing a specific program will be described using the program as the subject.

In step S101, the basic control program 301 waits for some sort of operation to be performed on the operation unit 107. When the operation unit 107 is operated, in step S702 the basic control program 301 determines whether the operation is the power off operation, and, if the operation is the power off operation, executes predetermined power off processing in step S703.

On the other hand, if the operation is not the power off operation, in step S704 the basic control program 301 determines whether or not the operation is an operation performed on the moving-image shooting instruction button 111 (input of moving-image recording start instruction). If the operation is not an operation performed on the moving-image shooting instruction button 111, the basic control program 301 executes processing that corresponds to the operation (step S705), and then returns the processing to step S701. On the other hand, if the operation is an operation performed on the moving-image shooting instruction button 111, in step S706 the basic control program 301 loads the container program 303 to the DRAM 103 and executes initialization processing. In the present embodiment, still images, a moving image, and audio are handled in a common container format, and therefore the loading of the container program 303 and initialization need only be performed one time.

Next, in step S707, the container program 303 generates data file heading information, which is specifically information to be stored in the file type box 401 and the movie box 402. Note that not all header information is generated here, and only information that can be generated (static information such as the moving image data resolution and rate) is generated. The basic control program 301 then performs file open processing, and writes the header information to the memory card 106.

In step S708, the shooting control program 302 executes automatic focus detection (AF) and automatic exposure control (AE) for a moving image. Note that the AF and AE processing referred to here can be carried out using known methods, and therefore will not be described in detail.

In step S709, the shooting control program 302 executes processing for shooting a moving-image (one frame-worth) that is based on the exposure conditions determined in step S708, and supplies image signals read out from the image sensor 1132 to the image processing unit 119.

In step S710, the image processing unit 119 executes image processing that is not dependent on encoding processing in the compression/decompression unit 120, such as A/D conversion processing and resolution conversion processing. Note that unless recording is to be performed in the RAW format, color interpolation processing (demosaic processing) and white balance adjustment processing are also performed here. Also, in the case of recording audio along with the moving image, the image processing unit 119 performs A/D conversion, noise reduction processing, and the like on audio signals.

In step S711, the compression/decompression unit 120 applies encoding processing to image (and audio) data received from the image processing unit 119. There are no limitations on the type of encoding that is applied here, and different encoding specifications may be applied for a moving image, still images, and audio. However, applying a common encoding specification makes it possible to reduce the burden on the playback device, and enables favorable response during playback. Note that the "common" encoding specification mentioned here refers to encoding that can be handled by one encoder program, or a range of encoding methods supported by a single standard, and there may be differences within the same standard. Note also that in the case of applying interframe predictive coding, the processing of step S711 is not necessarily applied to the moving image frame that was shot immediately previously. The compression/decompression unit 120 writes the encoded data to the work memory area 304 of the DRAM 103.

In step S712, the container program 303 calculates offset information that is to be stored in the track boxes 403 to 405 in the movie box 402. Specifically, for each track box provided for each type of data that can be stored in the media data box 406, the container program 303 calculates the correspondence between decoding times and samples, sample sizes, chunk offsets, and the like. Here, the container program 303 sets the chunk offset in a track that does not have actual data to a special offset value such as "0" so as to make it possible to identify that actual data does not exist.

Note that offset information is also calculated (generated) for a type of track that has no actual data so that entries with the same number store information corresponding to data regarding the same chunk in the tables stored in the respective track boxes. Also, the tracks for which offset information is calculated in step S712 are determined in advance, and in the case where moving-image shooting has started for example, offset information is calculated for a moving image track, a still image track, and an audio track, regardless of whether still-image shooting is performed during moving-image shooting.

It is desirable that writable data is successively written to a recording medium in order to prevent the data obtained by shooting from being lost. To achieve this, it is necessary to calculate offset information regarding actual data in the media data box 406. However, the offset information (chunk offset) contained in the management information indicates offsets from the head of the file, and therefore it is necessary to determine the size of the file type box 401 and the movie box 402 that are recorded before the media data box 406. For this reason, in the present embodiment, a fixed volume for the movie box 402 is ensured before calculating the offset information.

Normally, the length of the moving image that can be recorded in one file in the digital camera 100 is limited by the file system (e.g., 4 GB), limited in terms of continuous shooting time (e.g., 29 minutes 59 seconds), or the like. Accordingly, based on the number of samples per chunk and the frame rate, it is possible to obtain the maximum number of entries necessary for the track boxes 403 to 405 (the chunk offset box stco in particular). For this reason, the size of the movie box 402 that can store the maximum number of entries is ensured before calculating the offset information. Note that although the movie box 402 can be at any location in a file according to the standard, when consideration is given to the load of data movement processing within the file and the like, it is advantageous for the movie box 402 to be arranged ahead of all variable-length boxes in the file.

By ensuring an area for management information in advance in this way, this area that will be ensured in the memory card 106 is an area larger than the management information area necessary for actual data that is to be actually recorded. However, if a management information area corresponding to moving image data that is shorter than the maximum duration is ensured, and the ensured area becomes insufficient, a substantial amount of data reading/writing will need to be performed in order to shift the start position of the media data box 406 rearward. In particular, performing such a large amount of data movement (or copy) processing in a device that has a small memory capacity, such as a digital camera, a smartphone, or a tablet terminal, is time-consuming, and is also not preferable in view of power consumption. The size of the area that is ensured for management information is sufficiently small in comparison to the size of the moving image data. Accordingly, in the present embodiment, first the maximum size is ensured for the movie box 402, which is the container box for storing management information, and then actual data is recorded to the media data box 406.

Note that although the expression "still image track" has been used for the sake of convenience, it is presumed that tracks handle time sequence data such as moving images as described above, and therefore still images also need to be handled in a manner similar to frame images of a moving image. Accordingly, the container program 303 generates various types of information (management information) that is to be recorded to the movie box 402, such that in the case where still images are shot, the still images can be managed using moving image management information.

In step S713, the container program 303 receives a predetermined writing unit worth of the encoded data stream stored in the work memory area 304 of the DRAM 103, and transfers the received data to the basic control program 301. The basic control program 301 records the data to the memory card 106.

Then, in step S714, the container program 303 receives management information that corresponds to the actual data that was written in step S713, and transfers the management information to the basic control program 301. The basic control program 301 records this data to the memory card 106. In this way, due to writing management information that corresponds to the actual data that was written, even if the recording operation ends abnormally due to the power supply being suddenly turned off, the data that was captured up to that point can be in a state of being properly recorded on the memory card 106.

In step S715, the shooting control program 302 determines whether or not detection of the pressing of the release button 110 (input of a still-image shooting instruction) was notified from the basic control program 301. The shooting control program 302 may detect an operation performed on the operation unit 107 during shooting operations. If a still-image shooting instruction was input, the shooting control program 302 advances the processing to step S716.

If a still-image shooting instruction was not input, in step S719 the shooting control program 302 determines whether or not the moving-image shooting instruction button Ill 1 was pressed (a moving-image recording end instruction was input), and ends the shooting operations if a moving-image shooting end instruction was input. The basic control program 301 then performs file close processing and the like, and then returns the processing to step S701. On the other hand, if a moving-image recording end instruction was not input in step S719, the processing is returned to step S708, and processing continues on the next frame.

In step S716, the shooting control program 302 executes automatic focus detection (AF) and automatic exposure control (AE) for a still image. In the case of using a mechanical shutter in still-image shooting, moving image recording processing is interrupted at this time, but moving-image shooting processing for AF and AE processing may be continued. Note that the AF and AE processing referred to here can be carried out using known methods, and therefore will not be described in detail.

In step S717, the shooting control program 302 executes processing for shooting a still image (one frame) that is based on the exposure conditions that were determined in step S716. In the case of using a mechanical shutter for still-image shooting, the shooting control program 302 ends moving-image shooting processing, performs charge reset processing and the like, and therefore drives the diaphragm and the mechanical shutter and shoots a still image. In the case of not using a mechanical shutter for still-image shooting, moving image shooting and recording processing are continued. The shooting control program 302 supplies the image signals that were read out from the image sensor 1132 to the image processing unit 119.

In step S718, the image processing unit 119 executes image processing that is not dependent on encoding processing in the compression/decompression unit 120, such as A/D conversion processing and resolution conversion processing, and then advances the processing to step S711. Note that unless recording is to be performed in the RAW format, color interpolation processing (demosaic processing) and white balance adjustment processing are also performed here.

FIGS. 5 and 6 schematically show operations of the digital camera 100 and data recording operations in the case where continuous shooting of still images is performed using a mechanical shutter during moving-image shooting.

Assume that the user presses the moving-image shooting instruction button 111 at time t0 at which the digital camera 100 is in the shooting standby state. Accordingly, the CPU 101 (shooting control program 302) starts execution of the moving image recording operation. Here, assume that a FHD (1920×1080 pixels) 60 fps moving image is shot. The shooting operation is similar to moving-image shooting in the shooting standby state, but processing related to a moving image for recording, which is separate from a moving image for display, is added. A moving image for recording generally has a higher resolution than a moving image for display, and encoding processing is applied by the compression/decompression unit 120 in order to reduce the data amount. There are no limits on the encoding format, and it is possible to use a known method such as Motion-JPEG, MPEG-2, or H.264. Note that the shot frames may be recorded as-is (data compression may be performed) in the RAW format.

Also, if the recording of audio as well during moving-image shooting has been set, encoding processing is performed on the audio data as well by the compression/decompression unit 120. The compression/decompression unit 120 generates a moving image data stream and an audio data stream, and successively stores them to the work memory area 304 of the DRAM 103.

The container program 303 then starts processing for generating a data file, which has the container structure described with reference to FIG. 4, from the data streams stored in the work memory area 304. The basic control program 301 also starts processing for recording the generated data file to the memory card 106 via the memory card interface 105. The shooting and encoding processing, the data file generation processing, and the data file recording processing can be performed in parallel.

At time t1, when a still-image shooting execution instruction, such as full-pressing of the release button 110, is detected, the shooting control program 302 interrupts moving-image shooting and executes still-image shooting processing. Here, moving-image shooting is interrupted because a mechanical shutter is to be used during still-image shooting, but still-image shooting that uses an electronic shutter (described later) is equivalent to moving-image shooting, and therefore moving image data is obtained during still-image shooting as well.

While the release button 110 continues to be fully-pressed, the digital camera 100 of the present embodiment repeatedly executes still-image shooting processing (continuous shooting). Assume that the still images have 5472× 3648 pixels, and that the continuous shooting speed is 10 frames/second (10 fps). In the example in FIG. 5, the release button 110 is fully pressed from time t1 to time 2, and still-image shooting processing is executed multiple times consecutively. This still-image shooting processing is similar to the processing for one frame worth of moving-image shooting, with the exception that the resolution and the encoding method used in the compression/decompression unit 120 can be different from when moving-image shooting is performed. The compression/decompression unit 120 generates a still image data stream, and stores it to the work memory area 304 of the DRAM 103.

When the full-pressing of the release button 110 is released at time t2, the CPU 101 (shooting control program 302) resumes the moving-image shooting processing that was interrupted. Thereafter, when a moving-image shooting end (or pause) instruction (e.g., the moving-image shooting instruction button 111 being pressed again) is detected at time t3, the CPU 101 (shooting control program 302) ends (or pauses) the moving-image shooting processing.

FIG. 6 schematically shows encoding processing performed on data obtained in the shooting sequence shown in FIG. 5, and the stored state of the data in a data file. It is shown here that moving image, audio, and still image data are all encoded by the compression/decompression unit 120 in accordance with the same encoding method (H.264), and are stored in the same container (media data box (mdat) 406) in the data file.

In the figure, the moving image data stream 407 and the audio data stream 409 are divided into the section from times t0 to t1 and the section from time t2 to t3, which have actual data, but in actuality they may be continuous data streams. The shooting time and the location of actual data in the data streams are managed in the track boxes 403 and 405 in the movie box 402, and therefore it is possible to store data streams in which only the sections having actual data are connected together. It should be noted that since chunks are used as the management unit for actual data in the media data box 406 as described above, the sample count may be adjusted such that the number of samples that make up a data stream is a multiple of the number of samples per chunk.

Note that the above describes a configuration for successively recording data to the memory card 106 based on the presumption of preventing the loss of captured data, and processing with a small-capacity DRAM 103. However, if the capacity of the DRAM 103 is sufficiently large, and if the processing time is not a problem, a configuration is possible in which captured data is buffered in the DRAM 103 until recording ends, and then the data is written to a data file all at once.

Also, a configuration is possible in which multiple pieces of moving image data having different resolutions are recorded. For example, a configuration is possible in which both a moving image with a normal resolution and a moving image with a low resolution (reduced size) are recorded in the same data file. In this case, size-reduced frame images are generated by the image processing unit 119, and encoding processing is performed on the reduced-size frame images as well by the compression/decompression unit 120. Also, a track box for a reduced-size moving image is added to the movie box 402. Actual data for the reduced-size moving image data is also stored in the media data box 406.

As described above, the digital camera 100 of the present embodiment records image data of different expression methods, such as moving image data and still image data, in the same file. For this reason, related image data of different expression methods, such as a moving image and still images shot during the shooting of the moving image, can be handled together, and can be managed and used easily. Also, using a general-purpose container structure makes it possible to facilitate recording and playback.

For example, there are cases where, as described using FIG. 5, it is possible to perform still-image shooting during moving-image shooting, and moving image recording is interrupted during still-image shooting. In this case, moving image data exists in only the section A from time t0 to t1 and the section B from time t2 to t3. In such a case, during moving image playback, it may be necessary to perform processing for playing back the section A until its end, then displaying the still images shot from time t1 to t2, and then starting the playback of the section B.

Conventionally, moving image data and still image data obtained in the shooting sequence shown in FIG. 5 have been recorded as separate files. For this reason, during playback, it is necessary to search for the still image file that is to be played back in the section not having moving image data. For example, in the case where still images are continuously shot, the number of files increases according to the number of continuous shots, and management becomes troublesome, and there is also an increased possibility of some still image files being moved or deleted. However, by using a data file structure in which moving image data and still image data are stored in the same container format as in the present embodiment, the need to search for still image files is eliminated. Note that the container format refers to the method for storing data in a file, and using the same container format makes it possible to obtain data based on the same rules.

Also, generally-used moving image data files and still image data files have completely different data structures, and therefore obtaining still image data during playback has required the container program for retrieving data from a still image file to be loaded and initialized. However, in the present embodiment, moving image data and still image data are stored in a data file in the same container format, thus making it possible to search for and retrieve data in a file using the same container program. This therefore eliminates the need for resources and time for loading and initializing a container program for still image data in the playback device, and makes it possible to realize smooth switching between moving image playback and still image playback.

Furthermore, if the still image and moving image encoding format are also the same, only one decoding program is needed, thus making it possible to reduce the amount of resources needed for loading a decoding program in the playback device, and reduce the amount of time needed for initialization processing, compared to the case of using different encoding formats. These effects are even more pronounced in the case where the playback device is more constrained in terms of processing capability and memory resources than a personal computer, as with an image capture apparatus or a smartphone.

The following describes data file playback operations according to the present embodiment, for understanding the above-described effects.

FIG. 8 is a block diagram showing an example of the functional configuration of a smartphone 800 as one example of a playback apparatus. With the exception of a function for communication with a mobile phone network, it has a configuration similar to a computer device having fewer resources.

A CPU 801 realizes functions of the smartphone 800 by loading various programs 802, which are stored in a SSD 809 that is a nonvolatile storage apparatus, to a DRAM 803 and executing the programs. Included among the various programs 802 are a control program (operating system) 804, a container program 805, a decoding program 806, an application program 807, and the like. In addition to the various programs 802, the SSD 809 also stores various setting values, image data 810, and the like. Here, the image data 810 is a data file having the configuration that was described using FIG. 4. Note that the image data 810 may be stored in a removable recording apparatus such as semiconductor memory card or a USB memory.

The display unit 812 is generally a touch panel display. Also, an input unit 813 includes a power supply switch, a volume button, a silent mode button, and the like. The touch panel provided in the display unit 812 is also included in the input unit 813. A communication unit 814 has, for example, a transmitter/receiver for performing wireless communication via WiFi or Bluetooth (registered trademark), or with a mobile phone network or the like, as well as a connector and an interface for wired communication via USB or the like. A speaker 815 outputs audio, ringtones, and the like.

The DRAM 803 is a volatile memory, and is used for the loading of programs by the CPU 801, as well as a work area and a buffer memory. In the image data playback state shown in FIG. 8, the control program 804, the container program 805, the decoding program 806, and the application program 807 are loaded, and a portion of the free area is used as a work memory area 808.

The above-described function blocks are communicably connected to each other via a bus 816.

Next, details of operations during playback will be described with reference to FIGS. 9 to 12.

Here, it is assumed that, for example, a playback instruction for a specific data file has been input, via the input unit 813, on a screen displaying a list of playable image data pieces or the like, which is displayed by the application program 807. In the following description as well, the processing steps realized by the CPU 801 executing programs are described using the program as the subject. Note that the control program 804 is the OS, and the other programs operate using basic functions provided by the control program 804.

FIG. 9 is a flowchart showing playback processing operations of the smartphone 800. In step S901, the CPU 101 (application program 807) reads out the container program 805 from the SSD 808, and loads the container program 805 to the DRAM 803. The CPU 101 then starts execution of the container program 805.

In step S902, the CPU 101 (container program 805) executes processing for initialization of the container program 805. In the processing for initializing the container program 805, information such as the image size, bit depth, and frame rate is obtained from the data file that is to be played back, a buffer area is ensured in the DRAM 803, and the playback time and the initial value for the playback frame number are set.

In step S903, the CPU 101 (application program 807) reads out the decoding program 806 from the SSD 809, and loads the decoding program 806 to the DRAM 803. The CPU 101 then starts execution of the decoding program 806.

Using the container program, it is possible to obtain information indicating what type of data is recorded in the data file, how many pieces of data are recorded, what areas the pieces of data are recorded in, and the like.

In this way, based on the information on the data recorded in the data file, it is possible to load only the decoding program needed for playback processing to the DRAM 803 and initialize it. In particular, with a configuration in which data of diverse formats are stored in one file as in the present embodiment, loading decoding programs for all sorts of formats to the DRAM 803 and starting them up places a large burden on the playback apparatus. Accordingly, being able to specify the decoding program needed for playback by using one container program has a particularly pronounced effect. Also, by obtaining information on the number of data pieces, the sizes thereof, and the like earlier, it is possible to utilize them in subsequent playback processing.

In step S904, the CPU 101 (decoding program 806) executes processing for initializing the decoding program 806. In this initialization processing, initial values such as the image size, the bit depth, and the number of components are set, and a buffer area is ensured in the DRAM 803.

Note that multiple container programs and decoding programs may be stored in the various programs 802. In this case, the application program 807 may, for example, reference the metadata (movie box) of the data file that is to be played back, and determine (select) that programs that are to be loaded in step S901 and step S903 in accordance with the encoding format of the data stored in the file.

In step S905, the container program 805 obtains frame data from the data file. Details of this operation will be described later.

In step S906, the decoding program 806 performs decoding processing on the data obtained in step S905.

In step S907, the container program 805 obtains audio data that corresponds to the frame from the data file if such audio data exists. Note that audio data may be obtained along with the frame data (image data) in step S905.

In step S908, the decoding program 806 performs decoding processing on the audio data, and waits for the playback timing to be reached.

In step S909, the application program 807 displays the frames that were decoded in step S906 on the display unit 812.

In step S910, the application program 807 reproduces the audio data that was decoded in step S907, and outputs it from the speaker 815.

In step S911, the application program 807 checks whether a playback stop instruction was received from the input unit 813, and ends playback processing if a playback stop instruction has been received, or advances the processing to step S912 if a playback stop instruction has not been received.

In step S912, the application program 807 checks whether the data file targeted for playback has been played back to its end, and ends the playback processing if the data file has been played back to its end, or returns the processing to step S905 and repeats processing on the next frame if the data file has not been played back to its end.

FIG. 10 is a flowchart showing details of next-frame obtaining processing carried out in step S905 in FIG. 9. This processing is carried out by the CPU 801 executing the container program 805.

In step S1000, the container program 805 checks whether all of the frames in the playback chunk have been played back, and, if all of the frames have not been played back, increments the playback frame number (frame index) in step S1010, and advances the processing to step S1011.

On the other hand, if all of the frames in the playback chunk have been played back, the container program 805 searches for the next playback chunk. First, in step S1001, the container program 805 references the track box (moving image) in the movie box (moov) of the data file, and then in step S1002, obtains the head location (chunk offset) of the chunk that corresponds to the playback time. Chunk offset obtaining processing will be described in further detail later.

In step S1003, the container program 805 checks whether the chunk offset obtained in step S1002 is 0 (whether moving image data that corresponds to the playback time does not exist), and advances the processing to step S1004 if the chunk offset is 0, or advances the processing to step S1008 if the chunk offset is not 0.

In step S1008, the container program 805 sets the chunk that begins at the chunk offset obtained in step S1002, as the playback chunk. Then, in step S1009, the container program 805 sets the initial value 1 as the playback frame number (frame index) in the playback chunk, and advances the processing to step S1011.

In step S1004, the container program 805 references the track box (still image) in the movie box (moov) of the data file, and then in step S1005, obtains the head location (chunk offset) of the chunk that corresponds to the playback time. Chunk offset obtaining processing will be described in further detail later.

In step S1006, the container program 805 checks whether the chunk offset obtained in step S1005 is 0 (whether still image data that corresponds to the playback time does not exist), and advances the processing to step S1011 if the chunk offset is 0, or advances the processing to step S1007 if the chunk offset is not 0. In step S1007, the container program 805 sets the chunk that begins at the chunk offset obtained in step S1005, as the playback chunk, and then advances the processing to step S1009.

In step S1011, the container program 805 obtains the data of the frame that corresponds to the frame index in the playback chunk, and stores the obtained data in the work memory area 808 of the DRAM, for example. As described above, in the period in which data to be played back does not exist in the moving image track, the still image track is referenced, and if playback data exists, the same frame (frame index=1) of the still image track is repeatedly played back. Note that in the flowchart of FIG. 10, in the case where a still image is repeatedly played back, data obtaining is also performed repeatedly, but a configuration is possible in which data that has already been obtained is not obtained repeatedly.

The chunk offset obtaining operation in step S1002 and step S1005 will be described in further detail below with reference to FIGS. 11 and 12.

Here, the data file that stores the moving image data and still image data that were obtained in the shooting sequence shown in FIG. 5 is targeted for playback, and the number of samples (number of frames) per chunk is four.

The upper section in FIG. 11 schematically shows the data stored in the media box (mdat) in the data file, and the lower section schematically shows a timeline map of the edit list (elst) contained in the corresponding track box (trak).

An example of a method for obtaining the chunk offset that corresponds to the playback time t will be described below with further reference to the flowchart of FIG. 12.

In step S1201, the container program 805 references the edit box (elst) in the movie box 402 of the data file, and determines whether or not the target track (moving image or still image track) is active at the playback time t. In the example in FIG. 11, t1=<t<t2, and therefore the container program 805 determines that the target track is an active track, and advances the processing to step S1202. In the case of a determination that the target track is not an active track, the container program 805 advances the processing to step S1205, determines that there is no frame that is to be played back, sets the chunk offset to 0, and ends this processing.

In step S1202, the container program 805 references the decoding time-to-sample box (stts). The decoding time-to-sample box stores table-formatted data indicating the number of consecutive samples that have the same decoding start time interval (sample-delta). For example, in the case of ten samples arranged with decoding times at intervals of 10 on the time-scale, the table entry indicates a sample count of 10 and a sample-delta of 10. The sample-delta value is a value in the time-scale defined in the media header box (mdhd). The sample number at any decoding time can be obtained by accumulating the sample-delta and sample count in order beginning from the first table entry.

Specifically, the container program 805 can determine the playback sample number from the playback time t in the following manner. The media time is obtained by t−t1, and therefore in the case where t1=10 seconds, and t=12.26 seconds, for example, the media time is 2.26 seconds. For simplification here, assuming that the sample interval indicated by the sample-delta is fixed at 1/30 seconds, the sample number is obtained as 67 based on 2.26/(1/30)=67.8.

Next, in step S1203, the container program 805 references the sample-to-chunk box (stsc), obtains the number of samples per chunk, and obtains the chunk number that stores the sample number obtained in step S1202. Here, there are four samples per chunk, and therefore based on 67/4=16.25, the container program 805 can obtain 17 as the chunk number.

Next, in step S1204, the container program 805 references the chunk offset box (stco). The chunk offset box is a chunk location information table that indicates the locations of chunks in a file using file offsets (offsets from the head of the file). Accordingly, the container program 805 references the table entry that corresponds to the 17th chunk, and obtains the start location (start address) of the 17th chunk.

The chunk offset is obtained in this way.

In step S1011, in the case of obtaining frame data based on a frame index and a chunk offset, the container program 805 first references the sample size box (stco), and obtains the size of the samples contained in the target chunk. The 67th sample is the 3rd sample (frame index=3) in the 17th chunk.

Accordingly, letting stsz/table[65] and stsz/table[66] be the sizes of the 65th and 66th samples, it is possible to obtain the data start address of the 67th sample as shown below.

start address=chunk offset+*stsz*/table[65]+*stsz*/table[66]

The container program 805 then obtains, from the data file, the data having the size stsz/table[67] beginning from the start address of the 67th sample, as the playback frame data. Note that audio data can also be obtained using a similar procedure.

Generally, mobile electronic devices such as smartphones and tablet terminals have few memory resources, and this is a cause for a decrease in operational feeling or the like due to memory free space being suppressed when multiple container programs are loaded to the DRAM. For example, assume that moving image data and still image data shot during the shooting of that moving image have been recorded in different container formats (different files). In this case, if the still image is to be played back in the section in which the recording of the moving image data was interrupted, a container program for searching for the still image file that is to be played back and obtaining the playback data from the still image file needs to be loaded to the DRAM. However, in the present embodiment, when recording a data file, moving image data and still image data are stored in the data file in the same container format. For this reason, only the one container program 805 needs to be loaded to the DRAM 803, and this is advantageous to playback on an apparatus that has few memory resources. Also, even in the case of switching from moving image playback to still image playback, there is no need to search for still image data.

Note that the same applies to the encoding format as well. Accordingly, by using the same encoding format for the pieces of data that are to be stored in the data file in the same container format, only one type of decoding program needs to be loaded to the DRAM, and the effect is even more pronounced.

Also, in the present embodiment, using one container program, it is possible to obtain information indicating what type of data is recorded in the data file, how many pieces of data are recorded, what areas the pieces of data are recorded in, and the like, and this is useful to subsequent processing.

For example, based on the information on the data recorded in the data file, it is possible to load only the decoding program needed for playback processing to the memory and initialize it. In particular, with a configuration in which data of diverse formats are stored in one file as in the present embodiment, loading decoding programs for all possible formats to the memory and starting them up places a large burden on the playback apparatus. Accordingly, being able to specify the decoding program needed for playback by using one container program has a particularly pronounced effect. Also, by obtaining information on the number of data pieces, the sizes thereof, and the like earlier, it is possible to utilize them in subsequent playback processing.

Note that frames are played back in the recorded order in order to simplify the description and understanding in the above example, but a person skilled in the art would understand that there are cases where frames are not necessarily played back in the recorded order, such as the case of playing back moving image data subjected to interframe predictive coding. Also, still images do not need to be obtained by continuous shooting. Also, although a smartphone was described as an example of playback device having limited resources, the digital camera 100 is also included as a similar playback device.

Second Embodiment

Next, a second embodiment of the present invention will be described. In the shooting sequence of FIG. 5 that was given as an example in first embodiment, a mechanical shutter is used for still-image shooting, and therefore moving-image shooting is interrupted during still-image shooting (the section from time t1 to t2). In contrast, the present embodiment is related to a method of recording data obtained by a shooting sequence in which moving image data can also be obtained in the still-image shooting section by performing still-image shooting using an electronic shutter, as shown in FIG. 11.

Similarly to FIGS. 5 and 6, FIGS. 13 and 14 schematically show operations of the digital camera 100 and data recording operations in the case where continuous shooting of still images performed using an electronic shutter during moving-image shooting. The following describes differences from the first embodiment.

The start timing of moving-image shooting and still-image shooting is similar to the first embodiment. At time t1, when a still-image shooting execution instruction is detected, the shooting control program 302 changes a moving-image shooting parameter. Specifically, the shooting resolution is changed to the still-image shooting resolution. The shooting control program 302 also changes a setting of the signal processing processor 118. Specifically, the shooting control program 302 sets the image processing unit 119 so as to generate both RAW format data and data subjected to developing processing after size reduction, for each frame image obtained in the still-image shooting period. The shooting control program 302 also sets the compression/decompression unit 120 so as to perform lossless compression processing on the RAW format data and perform encoding processing on size-reduced images as moving image data frames in the still-image shooting period. Here, run-length encoding is performed as lossless compression processing, and H.264 encoding is performed as moving image encoding processing, but these are merely examples. Note that RAW format data may be lossily-encoded, and, in the case of using the RAW format for moving image data or the like, the moving image data may be losslessly-encoded.

Accordingly, in the example in FIG. 13, from time t1 to t2, shooting is performed at 60 frames per second with the still image resolution. During this time, the image processing unit 119 outputs RAW format captured images to the compression/decompression unit 120, and generates moving-image frame images that have been subjected to size reduction processing and developing processing, and outputs them to the compression/decompression unit 120 as well. The compression/decompression unit 120 performs run-length encoding on the RAW format captured images and generates a still image data stream, and stores the still image data stream in the work memory area 304 of the DRAM 103. The compression/decompression unit 120 also similarly performs H.264 encoding on the moving-image frame images from time t0, and stores the generated moving image data stream in the work memory area 304 of the DRAM 103.

When the full-pressing of the release button 110 is released at time t2, the CPU 101 (shooting control program 302) returns the moving-image shooting processing parameter to its original value. Accordingly, similarly to the period from time t0 to t1, the shooting resolution is returned to the moving-image shooting resolution, the processing of the image processing unit 119 is returned to developing processing, and the processing of the compression/decompression unit 120 is returned to moving image data stream generation. Thereafter, when a moving-image shooting end (or pause) instruction (e.g., the moving-image shooting instruction button 111 being pressed again) is detected at time t3, the CPU 101 (shooting control program 302) ends (or pauses) the moving-image shooting processing.

FIG. 14 schematically shows encoding processing performed on data obtained in the shooting sequence shown in FIG. 13, and the stored state of the data in a data file. This figure shows that the compression/decompression unit 120 performs H.264 encoding on the moving image and audio, performs run-length encoding on still images, and stores the encoded data in the same container (media data box (mdat) 406) in a data file.

Note that in the present embodiment as well, if the capacity of the DRAM 103 is sufficiently large, and if the processing time is not a problem, a configuration is possible in which captured data is buffered in the DRAM 103 until recording ends, and then the data is written to a data file all at once.

Also, a configuration is possible in which multiple pieces of moving image data having different resolutions are recorded. For example, a configuration is possible in which both moving image data with a normal resolution and reduced-size moving image data obtained by lowering the resolution of the moving image are recorded in the same data file. In this case, size-reduced frame images are generated by the image processing unit 119, and encoding processing is performed on the reduced-size frame images as well by the compression/decompression unit 120. Also, a track box for a reduced-size moving image is added to the movie box 402. Actual data for the reduced-size moving image data is also stored in the media data box 406.

In this way, even in the case of performing still-image shooting during moving-image shooting, if still images can be obtained without the moving image data becoming interrupted, there is no need for the encoding format of the still image data to be made the same as the encoding format of the moving image data. For this reason, the encoding format can be freely selected for the still image data and the moving image data respectively. For example, it is possible to use lossy compression encoding with a high compression rate for the moving image, and use lossless compression encoding for RAW format still image data, and appropriate encoding can be performed according to the type and purpose of the data. Also, in the present embodiment as well, still images and a moving image are stored in one data file in the same container format, thus obtaining effects such as that management of related data is facilitated, the need for file searching is eliminated, and the need to load multiple container programs in the playback device is eliminated.

Third Embodiment

Next, a third embodiment of the present invention will be described. In the case where, for example, time-consuming image processing needs to be applied to still images shot during moving-image shooting, and there is little leeway in terms of buffer memory capacity and processing capability, it is possible that moving image data will need to be recorded before image processing performed on still image data has ended. In such a case, as shown in FIG. 15, the still image data is stored in the buffer memory until recording of the moving image data ends, necessary image processing is applied after recording of the moving image data has ended, and the processed still image data is recorded as a different file from the moving image data.

However, in the case where moving-image shooting is interrupted when performing still-image shooting (section from time t to t2) as in the first embodiment, playback data for the section from time t1 to t2 will not be included in the moving image data file that was recorded first. A feature of the present embodiment is that still image data is added after the recording of a moving image data file, and a data file having the configuration described in first embodiment is generated.

In this case, a portion of the data file recording processing described with reference to FIGS. 7A and 7B is changed as shown in FIG. 16A, for example. Specifically, after still-image shooting (step S717), in step S1601 the shooting control program 302 determines whether or not specific time-consuming image processing (e.g., noise reduction processing) is to be applied to still images. For example, it is sufficient to determine whether or not a condition for application of specific image processing (e.g., shooting mode or shooting sensitivity) has been met.

Then, in the case where specific image processing is not to be applied, the shooting control program 302 advances the processing to step S718 similarly to the first embodiment. However, if specific image processing is to be applied, the shooting control program 302 stores the captured still image data to a buffer (work memory area 304 of the DRAM 103) in step S1602.

Then, in step S1603 the shooting control program 302 stores unique information regarding the still image data in the entry corresponding to the playback time in the edit box (elst) of the track box (trak) 403 for moving image data, and then advances the processing to step S715. Although there are no particular limitations on the unique information regarding the still image data, it is possible to use an image unique ID assigned by the image capture apparatus, for example.

Thereafter, if a moving-image shooting end instruction is input in step S719, the shooting control program 302 checks whether still image data is stored in the buffer. If still image data is stored, the shooting control program 302 causes the image processing unit 119 to apply image processing, causes the compression/decompression unit 120 to apply encoding processing, and then records the still image file to the memory card 106. Note that whether or not still image data is stored in the buffer can be easily determined based on a flag, if a configuration is employed in which a flag is set in step S1602.

Here, the compression/decompression unit 120 may apply encoding of the same standard as that for moving image data to the still image data, or may apply encoding of a different standard from that for moving image data. For example, a configuration is possible in which if the still image data file is to be deleted after later-described file merge processing, encoding of the same standard as that for moving image data is applied to the still image data, and if the still image data file is not to be deleted, encoding of a different standard from that of moving image data is applied.

Next, file merge processing will be described. For example, in the case where the processing load on the apparatus is low immediately after the still image file has been recorded separately from the moving image file, the shooting control program 302 executes file merge processing at a timing in accordance with a user instruction or the like. File merge processing is processing in which still image data that was captured during a period in which data recording was interrupted is added to a moving image data file.

File merge processing will be described below with reference to the flowchart shown in FIG. 16B. In step S1611, the shooting control program 302 analyzes the movie box 402 of the data file in the memory card 106, and determines whether or not still image unique information is stored in the track box 403 for moving image data.

If still image unique information is stored, in step S1612 the shooting control program 302 performs file merge processing. Specifically, the shooting control program 302 obtains still image data from the still image file that corresponds to the unique information stored in the moving image track box 403, and adds the still image data as a still image data stream to the end of the media data box 406. At this time, the encoding format of the still image data is changed by the compression/decompression unit 120 if necessary. Also, necessary metadata is stored in the corresponding still image track box 404.

Furthermore, the shooting control program 302 deletes the still image unique information that was stored in the moving image track box 403. As described above, an area is ensured in advance for the still image track box 404, and therefore there is no need to perform file copy processing for moving the media data box 406 in order to extend the capacity of the movie box 402. Accordingly, even an apparatus with few resources such as the digital camera 100 can realize file merge processing. Note that in the case where file merge processing is performed immediately after still image file recording, merge processing may be executed using the still image data that remains in the buffer. Also, the still image file may be deleted after file merge processing is complete.

According to the present embodiment, even in the case where data cannot be recorded in the same data file during shooting, effects similar to the first embodiment can be realized by merging data into the same data file after recording.

Fourth Embodiment

Next, a fourth embodiment of the present invention will be described. In the above embodiments, still image data captured during moving-image shooting is described as an example of the still image data that is stored in the same file as moving image data. However, in the present invention, the still image data that can be stored in the same file as moving image data is not limited to being image data that was obtained by shooting.

In the present embodiment, a configuration for recording moving image data and range image data in the same file will be described. A range image is information indicating the luminance of each pixel and the subject distance at the location of each pixel, and is also called a depth map, a depth image, or the like. Range image data can be generated using various methods, and in the present embodiment it is assumed that the image processing unit 119 generates range image data based on a pair of parallax image data pieces (stereo image data).

Stereo images can be obtained by using a multiple-lens camera such as a stereo camera as the image capturing unit 113, or using an image sensor 1132 that has a pupil dividing function. The following describes an example of a configuration using the image sensor 1132 that has a pupil dividing function.

First, an example of the configuration of the image sensor 1132 will be described with reference to FIGS. 17A to 17D. FIG. 17A schematically shows a state in which the image sensor 1132 is viewed from ahead and to the side of the digital camera 100. A microlens array 141 is formed over the light receiving surface of a pixel group 143 of the image sensor 1132. As shown in FIGS. 17B and 17C, the pixels making up the pixel group 143 are each constituted by one microlens 142 and two photodiodes (photoelectric conversion regions) 143a and 143b. Hereinafter, the photodiode 143a is called the A image photodiode (A pixel), and the photodiode 143b is called the B image photodiode (B pixel).

FIG. 17D conceptually shows an exit pupil 144 of an imaging optical system 1131, and, due to the microlens 142, an A image pupil 145a and the A pixel 143a have a conjugate relationship, and a B image pupil 145b and the B pixel 143b have a conjugate relationship. Accordingly, each pixel of the image sensor 1132 has a pupil dividing function, luminous flux that passes through the A image pupil 145a, which is the right half of the exit pupil 144, is incident on the A pixel 143a, and luminous flux that passes through the B image pupil 145*b*, which is the left half of the exit pupil 144, is incident on the B pixel 143*b*. Accordingly, the image (A image) made up of the A pixel group and the image (B image) made up of the B pixel group make up a pair of parallax images. Also, a normal captured image can be obtained by adding the pair of parallax images.

By detecting the amount of shift between the A image and the B image, it is possible to detect the defocus amount and defocus direction of the imaging optical system 1131. Accordingly, it is possible to realize automatic focus detection (AF) using phase difference detection based on signals output from the image sensor 1132.

Next, an example of a method for obtaining a range image from parallax images obtained from the image sensor 1132 having the above configuration will be described with reference to FIG. 18. FIG. 18 is a diagram schematically showing a method for calculating the subject distance at a certain pixel position. Assuming that an A image 151*a* and a B image 151*b* have been obtained in a certain pixel line, based on the focal length of the imaging optical system 1131 and distance information indicating the distance between the focus lens and the image sensor 1132, it is understood that luminous flux is refracted as shown by the solid lines. Accordingly, it is understood that the subject in focus is at the position indicated by 152*a*. Similarly, it is understood that in the case where the A image 151*a* and a B image 151*c* are obtained, the subject in focus is at a position 152*b*, and in the case where the A image 151*a* and a B image 151*d* are obtained, the subject in focus is at a position 152*c*. As described above, for each pixel, it is possible to calculate subject distance information at that pixel location based on relative positions in the A image signal that includes that pixel and in the corresponding B image signal.

For example, in the case where the A image 151*a* and the B image 151*d* are obtained in FIG. 18, a distance 153 from a pixel 154, which is at a midpoint corresponding to half of the image shift amount, to a subject position 152*c* is converted according to a luminance range (e.g., 0 to 255) for the pixel 154 and stored. For example, in the case of conversion in which a longer distance has a smaller luminance, the range image has a dark background portion. In this way, it is possible to calculate subject distance information at the position of each pixel, and generate a range image.

Note that although an image in which distance information is converted into a luminance for each pixel is generated in the above description, it is possible to generate an image in which, instead of distance information, the image shift amount of each pixel is converted into a luminance. It is also possible to calculate a distance by performing predetermined calculation based on a shift amount.

An image in which image shift amounts are converted into luminance is also included as a range image in the present application.

Accordingly, in the present embodiment, signals (parallax image signals) are separately read out from the A pixel group and the B pixel group of the image sensor 1132 and supplied to the image processing unit 119. The image processing unit 119 then generates a range image using the A image and the B image that make up a pair of parallax images. The image processing unit 119 also generates a normal image (moving image frame or still image) by adding the A image and the B image.

Note that if the A image and the B image can be generated by the image processing unit 119, readout from the image sensor 1132 does not necessarily need to be performed separately for the A pixel group and the B pixel group. For example, a configuration is possible in which an added signal for the A pixel and the B pixel (indicated as A+B) is read out from each pixel, the A pixel signal (indicated as A) is read out from each pixel, and the B pixel signal is obtained by calculating (A+B)−A. Alternatively, in order to reduce the amount of data, it is possible to read out (A+B) and a difference signal for the A pixel and the B pixel (A−B). A can be obtained by calculating {(A+B)+(A−B)}/2, and B can be obtained by calculating {(A+B)−(A−B)}/2.

Note that in the case of obtaining parallax images using a stereo camera, distance information for each pixel position can be calculated by extracting corresponding points between images and using the principle of triangulation. Also, a normal image can be obtained by performing weighted averaging on the parallax images.

For example, a configuration is possible in which the range image is generated only while the release button 110 is pressed during moving-image shooting in a specific shooting mode, and a configuration is possible in which the range image is generated based on frames of a moving image (or every time a specific number of frames are obtained). Alternatively, a configuration is possible in which the range image is generated during still-image shooting in the first and second embodiments, and is recorded as a still image. These are merely examples of timings for generating a range image, and configurations are possible in which it is generated using another trigger.

As one example, FIGS. 19 and 20 schematically show a shooting sequence and data recording operations in the case of generating and recording a range image instead of a still image in the second embodiment. In this case, from time t to t2, a range image 1702 is generated in parallel with a moving image 1701. The range image may be the same resolution as the moving image, and therefore there is no need to change the moving-image shooting parameter at t1. Also, the range image may be subjected to lossless compression, and therefore in consideration of convenience during playback, the compression/decompression unit 120 applies the same encoding as that for the moving image in the example in FIG. 20.

For example, the range image 1702 is recorded in the media data box 406 as a moving image data stream 410 that is different from the consecutive still image data stream 408. A track box is also separately added to the movie box 402. Alternatively, a range image may be recorded instead of a still image in the first embodiment.

In the case where the playback device plays back the moving image data in the data file, it is possible to perform playback processing using the range image recorded in the same container as the moving image data. Any type of image processing may be applied to playback image frames using the range image, and, for example, it is possible to apply processing for defocusing the background portion. In the case where the range image is generated such that the luminance is smaller as the distance is larger, it is possible to playback a moving image 1703 in which the main subject is emphasized by applying processing for defocusing (smoothing) the region in the moving image frames that correspond to the region in which the luminance in the range image is less than or equal to a threshold value. Intensity in the defocus processing may be controlled such that defocusing is intensified as the distance increases, for example.

Checking for the existence of a range image that can be used for a playback frame, and image processing performed on the playback frame with use of the range image can be executed between step S906 and step S907 in the playback processing in FIG. 9, for example. Whether a range image that can be used for a playback frame exists or not can be determined by referencing the corresponding entries in the track box for the moving image and the track box for the range image.

Modifications

Note that playback using a range image is not limited to a moving image, and is also useful to still images. Accordingly, a configuration is possible in which a range image is generated during still-image shooting, and a still image and the range image are stored in the same data file. In this case, the same encoding format (e.g., JPEG format) may be used for the still image and the range image, or different encoding formats (e.g., run-length encoding for the still image and the JPEG format for the range image) may be used. Note that still-image shooting may be consecutive shooting or single-image shooting, and, in the case of consecutive shooting, consecutively shot still images and multiple corresponding range images are stored in the same file.

In the present embodiment as well, moving image data or still image data and range image data are stored in the same file in the same container format, and therefore there is no need for a container program for retrieving the range image data to be loaded and initialized by the file playback device. Also, by using the same encoding format for moving image data or still image data and the range image data, there is no need for decoding program to be loaded and initialized for the range image data. For this reason, it is possible to realize smooth playback processing in even a playback device that has few resources.

Fifth Embodiment

Next, a fifth embodiment of the present invention will be described. A configuration for generating a range image from parallax images and recording it is described in the fourth embodiment, but the parallax images can be stored in the same file. By storing the parallax images in the same file, there is no need to search for pairs of parallax images in a playback apparatus that performs stereoscopic display, for example. Also, information necessary for stereoscopic display, such as location information for the shooting viewpoint for each image, angle of convergence, and base line length are also stored as metadata in the same file.

Here, assume that each pixel of the image sensor 1132 is divided into two sections in both the vertical and horizontal directions, so as to have a total of four pixels (A pixel 143*a*, B pixel 143*b*, C pixel 143*c*, and D pixel 143*d*), as shown in FIG. 17E. Also, the shooting viewpoint location of the image made up of the A pixel group is used as a reference for defining the shooting viewpoint location of the images made up of the other pixel groups.

FIG. 21 is a diagram schematically showing exemplary four-view moving image data recording operations. The four parallax images respectively obtained from the A (upper left) pixel group, the B (lower left) pixel group, the C (upper right) pixel group, and the D (lower right) pixel group of the image sensor 1132 are stored in the same container (media data box) 406 as separate moving image data streams. Note that although a configuration for recording data for each parallax image is described here to simplify the description and understanding, it may be recorded in combination with other image data, such as partially being addition image data, as long as it is possible to ultimately obtain data for each of the parallax images.

Also, metadata for using the four parallax images in stereoscopic display is stored in the movie box 402 using an extension type box (uuid) 2101 as shown in FIG. 22. The extension box 2101 stores a shooting information box 2102 and a capturing method box 2103. The shooting information box 2102 contains the four parallax images, and stores information that is common to respective moving image data streams, such as the frame rate and the resolution. Also, the capturing method box 2103 stores a table 2109 that associates information related to the viewpoint locations of the parallax images (e.g., information on the positional relationship between a reference viewpoint and another viewpoint) with track identifiers.

The track boxes 2104 to 2107 are similar to the moving image track box 403. Note that although not shown, an audio track box also exists. The media data box 406 stores individual moving image data streams as shown in FIG. 21. Note that although streams are stored independently for each viewpoint in the media data box 406 for the sake of convenience in FIG. 21, the image data for the respective viewpoints obtained at the same time as shown in FIG. 4 are actually recorded successively.

Although a configuration in which moving image data for multiple viewpoints is stored in the same file in the same container format is described in the present embodiment, still image data for multiple viewpoints can be recorded in a similar manner. According to the present embodiment as well, there is no need to search for image data in the playback device, and only one container program needs to be loaded and executed. Also, by using the same encoding format for the parallax images, only one decoding program needs to be loaded and executed by the playback apparatus, and it is possible to suppress the amount of memory that is consumed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-130328, filed on Jun. 29, 2015, which is hereby incorporated by reference herein in its entirety.

The invention claimed is:

1. A data recording apparatus comprising:
   at least one processor that executes instructions stored in a memory and thereby functions as:
   an obtaining unit that obtains first image data and second image data, the second image data having a different expression method from the first image data, wherein the first image data is obtained by moving-image shooting and wherein the second image data is obtained by still-image shooting; and
   a recording unit that stores, in a data file having a container structure, the first image data, the second image data, metadata regarding the first image data, and metadata regarding the second image data, and recording the data file,
   wherein the recording unit stores the first image data and the second image data in the data file in the same container format, and
   wherein the first image data in a period that corresponds to the second image data does not exist in the data file.

2. The data recording apparatus according to claim 1, wherein the at least one processor further functions as:
   an encoding unit,
   wherein the encoding unit encodes the first image data and the second image data in the same encoding format, and
   the recording unit stores in the data file the first image data and the second image data that were encoded by the encoding unit.

3. The data recording apparatus according to claim 1, wherein if the first image data and the second image data do not need to be played back in a continuous manner, the encoding unit encodes the first image data and the second image data in different encoding formats.

4. The data recording apparatus according to claim 1,
   wherein the first image data is still image data or moving image data, and
   the second image data is range image data that is related to the first image data.

5. The data recording apparatus according to claim 4, wherein the at least one processor further functions as:
   a generating unit that generates the second image data from a plurality of pieces of parallax image data,
   wherein the first image data corresponds to data obtained by addition of the plurality of pieces of parallax image data.

6. The data recording apparatus according to claim 1, wherein the first image data is moving image data and the second image data is reduced-size moving image data obtained by reducing a resolution of the moving image data.

7. The data recording apparatus according claim 1, wherein the data file has a container structure that conforms to an ISO base media file format or a format compatible with the ISO base media file format.

8. The data recording apparatus according claim 1, further comprises an image sensor for obtaining the first image data and the second image data.

9. The data recording apparatus according to claim 1, wherein the first image data is moving image data in a RAW format and the second image data is still image data obtained from the moving image data.

10. The data recording apparatus according to claim 1, wherein the first image data is moving image data constituted by parallax images, and the second image data is range image data obtained from the moving image data.

11. A method of controlling a data recording apparatus, comprising:
    obtaining first image data and second image data, the second data having a different expression method from the first image data, wherein the first image data is obtained by moving-image shooting and wherein the second image data is obtained by still-image shooting;
    storing a data file having a container structure, the first image data, the second image data, metadata regarding the first image data, and metadata regarding the second image data; and
    recording the data file,
    wherein in the storing, the first image data and the second image data are stored in the data file in the same container format, and
    wherein the first image data in a period that corresponds to the second image data does not exist in the data file.

12. A non-transitory computer-readable medium that stores a program for causing a computer to function as a data recording apparatus that comprises:
    obtaining unit that obtains first image data and second image data, the second image data having different expression method from the first image data, wherein the first image data is obtained by moving-image shooting and wherein the second image data is obtained by still-image shooting; and
    a recording unit that stores, in a data file having a container structure, the first image data, the second image data, metadata regarding the first image data, and metadata regarding the second age data, and recording the data file,
    wherein the recording unit stores the first image data and the second image data in the data file in the same container format, and
    wherein the first image data in a period that corresponds to the second image data does not exist in the data file.

* * * * *